(12) United States Patent
Du et al.

(10) Patent No.: US 10,719,345 B2
(45) Date of Patent: Jul. 21, 2020

(54) CONTAINER IMAGE BUILDING

(71) Applicant: International Business Machines Corporation, Armonk, NY (US)

(72) Inventors: Yan Du, Beijing (CN); Lan Luo, Beijing (CN); Jun Li Zhao, Beijing (CN); Jian Dong Yin, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/980,946

(22) Filed: May 16, 2018

(65) Prior Publication Data

US 2019/0354389 A1    Nov. 21, 2019

(51) Int. Cl.
*G06F 9/455* (2018.01)

(52) U.S. Cl.
CPC ...... *G06F 9/45558* (2013.01); *G06F 9/45545* (2013.01); *G06F 2009/45562* (2013.01); *G06F 2009/45583* (2013.01)

(58) Field of Classification Search
CPC ............................................. G06F 9/45533–46
See application file for complete search history.

(56) References Cited

U.S. PATENT DOCUMENTS

| | | |
|---|---|---|
| 9,639,558 B2 | 5/2017 | Alton |
| 2017/0068676 A1* | 3/2017 | Jayachandran ....... G06F 16/125 |
| 2017/0177860 A1* | 6/2017 | Suarez .................... G06F 21/31 |
| 2017/0300311 A1 | 10/2017 | Vasquez Lopez et al. |
| 2018/0095973 A1* | 4/2018 | Huang ................ G06F 16/1748 |
| 2018/0341471 A1* | 11/2018 | Stefanov ................. G06F 9/455 |
| 2019/0050680 A1* | 2/2019 | Waugh ................. G06K 9/6218 |

FOREIGN PATENT DOCUMENTS

CN    106227579 A    12/2016

OTHER PUBLICATIONS

The ENTICE Approach to Decompose Monolithic Services into Microservices Gabor Kecskemeti, Attila Csaba Marosi and Attila Kertesz (Year: 2016).*

(Continued)

*Primary Examiner* — Emerson C Puente
*Assistant Examiner* — Paul V Mills
(74) *Attorney, Agent, or Firm* — Christopher Pignato, Esq.; George S. Blasiak, Esq.; Heslin Rothenberg Farley & Mesiti, PC

(57) ABSTRACT

Methods, computer program products, and systems are presented. The method, computer program products, and systems can include, for instance: obtaining configuration data that specifies a designated runtime container image; selecting a first subset of content of a first container image stored in a system memory, the selecting based on an action referenced in the configuration data; extracting the first subset of content from the first container image, the extracting including providing a second container image that includes the first subset of content of the first container image and is absent of a second subset of content of the first container image; and running the designated runtime container image to provide a runtime container, the designated runtime container image having the first subset of content of the first container image.

20 Claims, 21 Drawing Sheets

(56) References Cited

OTHER PUBLICATIONS

ENTICE VM image analysis and optimised fragmentation 2 Attila Csaba Marosi, Akos Hajnal, Jozsef Kovacs Project ENTICE Deliverable 3.4 (Year: 2017).*

ENTICE VM Image Analysis and Optimised Fragmentation Akos Hajnal, Gabor Kecskemeti, Attila Csaba Marosi, Jozsef Kovacs Peter Kacsuk, Robert Lovas J Grid Computing (2018) 16:247-263 (Year: 2018).*

ENTICE Knowledge Base and User Interfaces I Polona Štefanič Project ENTICE Deliverable 5.4 (Year: 2016).*

ENTICE Optimised VM image synthesis 2 Responsible author(s): Attila Csaba Marosi, Akos Hajnal Project ENTICE Deliverable: 3.2 (Year: 2017).*

Distributed Environment for Efficient Virtual Machine Image Management in Federated Cloud Architectures Dragi Kimovski, Attila Csaba Marosi, et al. (Year: 2016).*

Introductory Unix Labs (Year: 2011).*

Session 2: Manipulating files and directories (Year: 2004).*

Singularity 1.1.4, Project description Vanessa Sochat Retrieved: https://pypi.org/project/singularity/1.1.4/ (Year: 2017).*

Singularity: Scientific containers for mobility of compute Gregory M. Kurtzer, Vanessa Sochat, Michael W. Bauer (Year: 2017).*

Understand images, containers, and storage drivers Docker Inc Web archive of: docs.docker.corn/engine/userguide/storagedriver/irnagesandcontainers/ (Year: 2016).*

Unknown, "*How to Build Docker Container Images with Dockerfile*" Linux Techi, https://www.linuxtechi.com/build-docker-container-images-with-dockerfile/, accessed Dec. 6, 2017.

"*How do I combine several images into one via Dockerfile*" Github Forums, accessed Dec. 6, 2017.

"*Support COPY from other builds*" Github Forums, accessed Dec. 6, 2017.

Unknown, "*Using Custom-Build Docker Images*" Circle CI, https://circleci.com/docs/2.0/custom-images/#prerequisites, accessed Dec. 6, 2017.

* cited by examiner

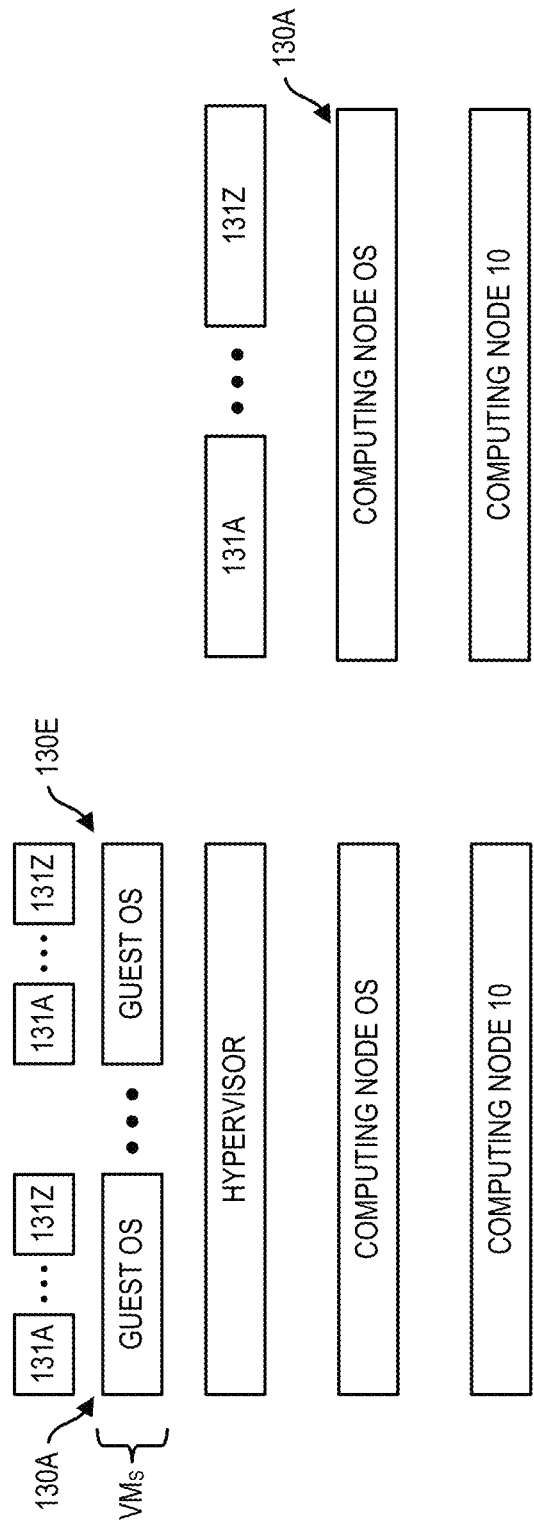

Logical Operation:
INTERSECT(IMAGE1, IMAGE2) = LAYER NGINX
FIRST(IMAGE1) = LAYER TOMCAT
(REST(REST(IMAGE2)) = LAYER CENTOS Logical Operation:
FIRST(IMAGE2) = LAYER PHP
(REST(REST(IMAGE2)) = LAYER CENTOS

CONTAINER IMAGE BUILDING

BACKGROUND

With container-based virtualization, isolation between containers can occur at multiple resources, such as at the file-system, the network stack subsystem, and one or more namespaces, but not limited thereto. Containers of a container-based virtualization system can share the same running kernel and memory space.

Container based virtualization is significantly different from the traditional hypervisor based virtualization technology involving hypervisor based virtual machines (VMs) characterized by a physical computing node being emulated using a software emulation layer.

A container image can be formed using a set of one or more layers. For example, a container image may include one layer for modifying the operating system to a specific version or specific customization—e.g., apply UBUNTU® 14.04 binary to the underlying LINUX® operating system (UBUNTU® is a registered trademark of Canonical Ltd. and LINUX® is a registered trademark of Linus Torvalds). Another layer might include configuration data for the operating system customization—e.g., UBUNTU® configuration. Another layer might apply or remove updates to the modified operating system—e.g., apply UBUNTU® system updates. Another layer might include an application to be configured in the container—e.g., the binaries of an application server; another layer might include the configuration data of the application server. Another layer can specify a webservice. Another layer can specify a development platform. Another layer might include the binary or other data of a user application that is to be executed using the container. Another layer might include a set of environment variables that is needed to successfully operate the application server, the user application, or both on the container; and so on. Many different types of layers can be similarly configured in a container image, and any number of layers can be configured in a container image to create a container.

Container based virtualization technology offers higher performance and less resource footprint when compared to traditional virtualization, and has become an attractive way for cloud vendors to achieve higher density in the datacenter. Thus, containerization (i.e., operating a virtualized data processing environment using container-based virtualization) is changing how workloads are being provisioned on cloud infrastructure.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: obtaining configuration data that specifies a designated runtime container image; selecting a first subset of content of a first container image stored in a system memory, the selecting based on an action referenced in the configuration data; extracting the first subset of content from the first container image, the extracting including providing a second container image that includes the first subset of content of the first container image and is absent of a second subset of content of the first container image; and running the designated runtime container image to provide a runtime container, the designated runtime container image having the first subset of content of the first container image.

In another aspect, a computer program product can be provided. The computer program product can include a computer readable storage medium readable by one or more processing circuit and storing instructions for execution by one or more processor for performing a method. The method can include, for example: obtaining configuration data that specifies a designated runtime container image; selecting a first subset of content of a first container image stored in a system memory, the selecting based on an action referenced in the configuration data; extracting the first subset of content from the first container image, the extracting including providing a second container image that includes the first subset of content of the first container image and is absent of a second subset of content of the first container image; and running the designated runtime container image to provide a runtime container, the designated runtime container image having the first subset of content of the first container image.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining configuration data that specifies a designated runtime container image; selecting a first subset of content of a first container image stored in a system memory, the selecting based on an action referenced in the configuration data; extracting the first subset of content from the first container image, the extracting including providing a second container image that includes the first subset of content of the first container image and is absent of a second subset of content of the first container image; and running the designated runtime container image to provide a runtime container, the designated runtime container image having the first subset of content of the first container image.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1B is a system block diagram illustrating an architecture for hosting a container according to one embodiment;

FIG. 1C is a system block diagram illustrating an architecture for hosting a container according to one embodiment;

DETAILED DESCRIPTION

Figure 1A:
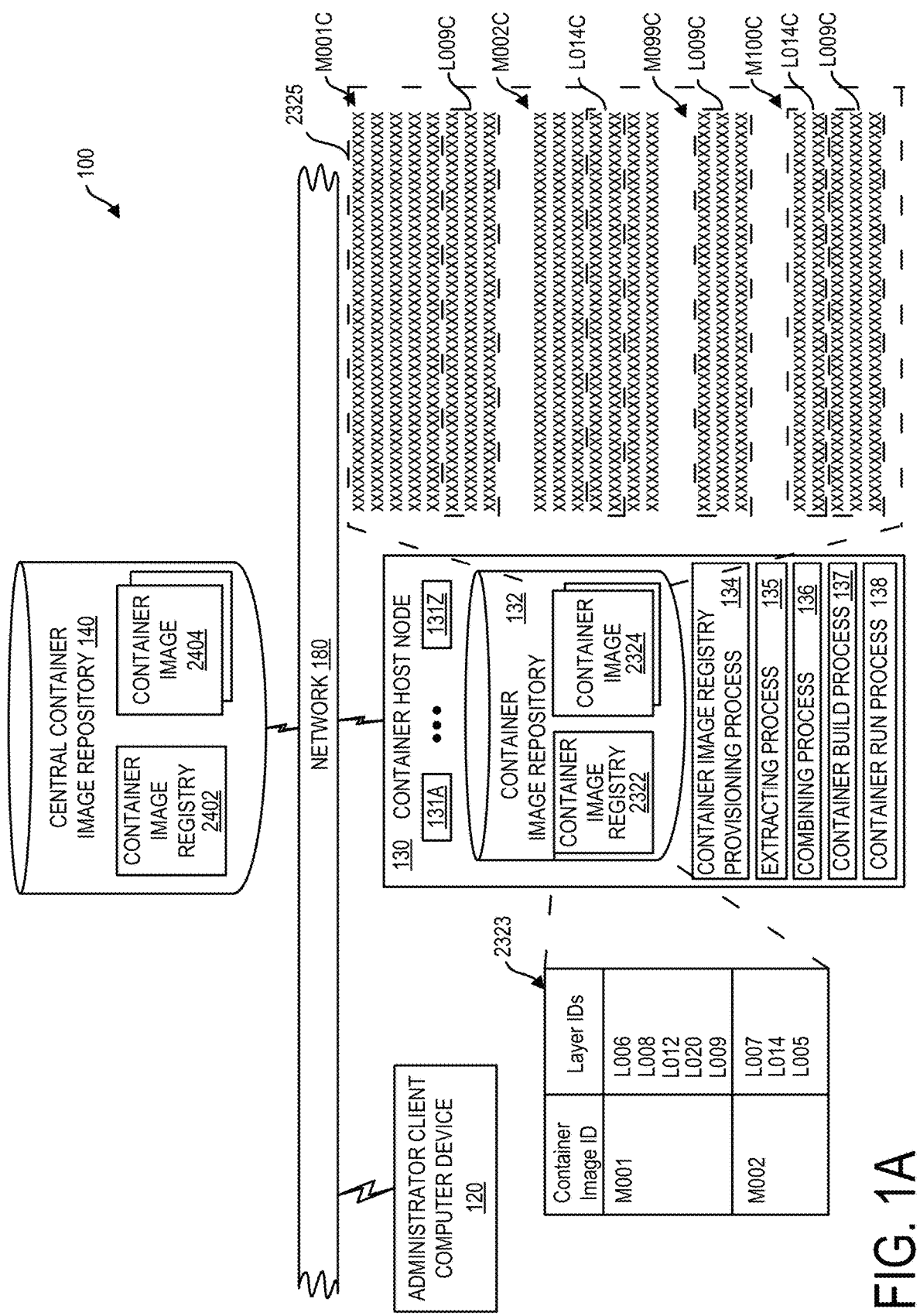
FIG. 1A is a block diagram illustrating a system having a container host node and a central container image repository according to one embodiment.

System 100 for use in building running containers is set forth in one embodiment in FIG. 1A. System 100 in one embodiment can include a container host node 130 in communication with central container image repository 140 via network 180. System 100 according to one embodiment can also include the administrator client computer device 120. Network 180 may be a physical network and/or a virtual network. A physical network can be, for example, a physical telecommunications network connecting numerous computing nodes or systems, such as computer servers and/or computer clients. A virtual network can, for example, combine numerous physical networks or parts thereof into a logical virtual network. In another example, numerous virtual networks can be defined over a single physical network.

In one embodiment container host node 130, central container image repository 140, and/or administrator client computer device 120 can be external to one another. In another embodiment, one or more of container host node 130, central container image repository 140, and/or administrator client computer device 120 can be collocated with one another. In one embodiment central container image repository 140 can be remote from container host node 130. In one embodiment container host node 130 and central container image repository 140 can be provided in different physical environments. For example, container host node 130 can be located within a first datacenter and central container image repository 140 can be located within a second datacenter external and remote from the first datacenter.

Container host node 130 can run one or more container 131A-131Z and can also run various processes for use in building container images. Container host node 130 can include container image repository 132 having e.g. a container image registry 2322 and container image area 2324 for storing stored container images. Container image area 2324 can be provided by a system memory of container host node 130. Container host node 130 can run a container image registry provisioning process 134, extracting process 135, combining process 136, container build process 137 and container run process 138. Container image repository 132 can define a local image repository of container host node 130.

Central container image repository 140 can include a container image registry 2402 and container image area 2404 storing a plurality of container images.

Exemplary architectures for hosting containers 131A-131Z are set forth in FIGS. 1B and 1C. As depicted in FIG. 1B, containers of containers 131A-131Z can be run on a container host node 130, where container host node 130 can be provided by a virtual machines (VM), e.g. a traditional hypervisor based virtual machine running on a hypervisor (potentially with other VMs, which hypervisor can run on a computing node OS that runs on computing node 10 provided by a physical computing node as set forth herein). As depicted in FIG. 1C, containers of containers 131A-131Z can be run on a container host node, e.g. container host node 130 provided by a computing node OS running on computing node 10 provided by a physical computing node as set forth herein. Container image area 2324 as shown in FIG. 1A for storing container images defined by binary data and/or text data content can be provided by a system memory of container host node 130. For the architecture as depicted in FIG. 1B, a system memory of container host node 130 can be provided by a virtualized system memory and/or the system memory of computing node 10 provided by a physical computing node which can be shared by multiple hypervisor based VMs. For the architecture as depicted in FIG. 1C, a system memory can be provided by the system memory of computing node 10 provided by a physical computing node. A computing node system memory according to one embodiment is set forth herein further in reference to FIG. 7.

Container image registry 2402 of central container image repository 140 can store a plurality of container images. Container images stored within central container image repository 140 can include an executable package provided by a piece of software that includes code runtime, system tools, system libraries, and settings. Container image registry 2402 can include data on container images stored within container image area 2404. Container image registry 2402 can store data specifying, e.g. a list of container image file names for files stored in container image area 2404, data on system memory locations of container images stored within container image area 2404, and/or metadata that specifies content included within stored container images stored within container image area 2404.

Container images as set forth herein can include, e.g. one or more layer. For example, a container image may include one layer for modifying an underlying LINUX® operating system, another layer might include configuration data for the operating system customization, another layer might apply or remove updates to the modified operating system, another layer might include an application to be configured in the container, e.g. the binaries of an application server, another layer might include the configuration data of the application server, another layer can specify a web service, another layer can specify a development platform, another layer might include the binary or other data of a user application that is to be executed using the container, another layer might include a set of environmental variables that is needed to successfully operate the application server, the user application, or both on the container, and so on.

Metadata of container image registry 2402 in some embodiments can include data specifying the content of various layer(s) of container image having one or more layer. Container image area 2404 can include one or more container image database and in one embodiment can store container images made available from different sources, e.g. a first OS modification layer provided by UBUNTU® or a second OS modification layer provided by CENTOS® (CENTOS® is a registered trademark of Red Hat, Inc. of Raleigh, N.C., US). Container images stored in container image area 2404 can be provided, e.g. by single layer container images or multiple layer container images comprising multiple layers. In the building of new container images, single layer container images can be referenced for compositing, with other single layer container images or with multiple layer container images to define new container images. Multiple layer container images stored in a database of container image area 2404 can include custom container images, custom authored by administrator users of system 100. Such custom authored container images can be custom authored to provide any arbitrary service. Container image area 2404 of central container image repository 140 can include updated container images, including update container image products made available by a plurality of container image providers, e.g. OS modification container layer providers, web service container layer providers, and/or development platform container layer provides and the like.

System 100 can be used by a plurality of enterprises, e.g. business or other organizational enterprises. For example, a first enterprise can operate container host node 130 and zero or more additional container host nodes and one or more additional enterprises can operate additional container host nodes. In some use cases there can be different administrator users at different enterprises that can custom author new container images and build such custom authored container images, and on creating such custom authored and built container images can upload such custom container images for storage into container image area 2404 where the custom authored container images are available to different enterprises. Multiple layer container images stored in a database of container image area 2404 can include such custom authored container images custom authored by administrator users of system 100.

Areas of central container image repository 140 can be publicly accessible, but central container image repository 140 can include private areas, e.g. accessible only by a single enterprise such as the enterprise operating container host node 130 as shown in FIG. 1A. For example, the operator of central container image repository 140 can provide a subscription service and the enterprise operating container host node 130 can subscribe to such service to obtain access to private areas of central container image repository 140 that are accessible only to the enterprise operating container host node 130.

Embodiments herein recognize that challenges exist with respect to downloading container images from central container image repository 140 to a container host node. One approach for running a container on a container host node can include authoring a container image build file, e.g. in the case of the DOCKER® platform, a DOCKERFILE™ (DOCKER® and DOCKERFILE™ are trademarks of Docker, Inc. of San Francisco, Calif.). However, as the application supported by the defined container image become more detailed, a container image build file when used for building a container image can require multiple downloads of multiple images from container image area 2404 of central container image repository 140 rendering the building resulting in a build process that is time-consuming and susceptible to error. If there are errors in the build file, multiple container images can be downloaded during the debugging process. If there is a multilayer prebuilt custom container image stored in container image area 2404 of central container image repository 140, such custom-built container images can be a gigabyte size resulting in time-consuming downloading, and further such custom-built container images may not be ideally customized for the use case required by the enterprise operating container host node 130. Embodiments herein recognize that existing processes for container image builds involving use of container image build files can feature resource utilization inefficiencies in the aspect that they require an order wherein parent layers are built first and dependent child layers are built subsequently.

Embodiments herein can include features to facilitate building of container images with reduced reliance on container image downloads from central container image repository 140 (e.g. fewer downloads or downloads eliminated altogether). Embodiments herein can facilitate reduced downloads with increased utilization of locally stored container images. Referring again to FIG. 1A, container image registry provisioning process 134, extracting process 135, and combining process 136 can be run so that in the building of the new container image, container host node 130 can increase use of preexisting container image content of container images stored in container image area 2324 with reduced reliance on downloads of container images of container image area 2404 of central container image repository 140.

Container image registry provisioning process 134 can provision container image registry 2322 to include information on the layer structure of various container images stored in container image area 2324. For example, referring to FIG. 1A, container image registry provisioning process 134 can be run so that container image registry 2322 includes decision data structure 2323 as set forth in FIG. 1A. Decision data structure 2323 can associate container image IDs to layer IDs that specify layers that define particular container images that are specified by container image IDs.

Referring to FIG. 1A, container image registry provisioning process 134 can be run so that decision data structure 2323 has the information that the container image identified by container image ID, M001, has the layer structure of layers specified by the layer IDs, L009-L020-L012-L003-L006, and further has the information that the container image specified by container image ID, M002, has the layer structure of layers specified by the layer IDs, L005-L014-L007.

Embodiments herein can feature extracting binary data and/or text data content of a container image and building a new container image using extracted content resulting from the extracting. In one embodiment, can include extracting binary data and/or text data content of a stored container image and providing the extracted content resulting from the extracting as the built container image. According to another embodiment, building a container image can include extracting content of a stored container image and using the extracted content resulting from the extracting as the container image subject to building. In another embodiment, building a new container image can include, e.g. extracting content from a first stored container image and extracting content of a second container image and composing the new container image so that the new container image includes extracted content of the first stored container image and content of the second container image. Atomic actions can be provided to process binary data and/or text data content of a container image.

Container host node 130 running extracting process 135 can extract binary data and/or text data content from a stored container image. Container host node 130 running extracting process 135 can include container host node 130 performing a "first" atomic action, a "rest" atomic action, a "referenced" atomic action, a "subtract" atomic action and/or an "intersect" atomic action as set forth herein.

Container host node 130 running combining process 136 can include container host node 130 performing a "merge" atomic action as set forth herein.

Container host node 130 running container build process 137 can include container host node 130 performing processes to build a container as set forth herein. Container host node 130 running container build process 137 can include container host node 130 running extracting process 135 and/or combining process 136.

Container host node 130 running container run process 138 can include container host node 130 performing a "run" command to run a designated runtime container image that has been built by a container build process as set forth herein. Container host node 130 running container run process 138 can include container host node performing a command to run a container image to provide a runtime container, wherein the container image subject to running can be a container image built using container build process 137.

Container host node 130 running extracting process 135 can include container host node 130 extracting binary data and/or text data content from a container image stored in container image area 2324. Area 2325 as set forth in FIG. 1A depicts binary data and/or text data content of container images stored in container image area 2324 of container image repository 132. Referring to area 2325, binary data and/or text data content M00 depicts the binary data and/or text data content of the container image specified by container image ID, M001. Container host node 130 running extracting process 135 can extract binary data and/or text data content specific to a particular layer of the container image having the content M001C. For example, running extracting process 135 container host node 130 can extract binary data and/or text data content, L009C which can be binary data and/or text data content of the container image associated to the particular container image layer specified by the layer ID, L009. Building of a new container image can include extracting of binary data and/or text data content of a container image and using the extracted binary data and/or text data content as a container image subject to provide a runtime container.

Referring to area 2325, binary data and/or text data content M099C includes the extract binary data and/or text data content L009C from the binary data and/or text data content M00 associated to the container image M001. The extracted binary data and/or text data content L009C can define a new container image having binary data and/or text data content, M099C which can be specified to have a new container image ID, M099. The new container image M099 provided by extracting binary data and/or text data content from the container image specified by the container image M001 can be subject to running to define a runtime container. The new container image M099 provided by extracting binary data and/or text data content from the container image specified by the container image M001 can alternatively be used as an intermediary image and subject to further processing so that the binary data and/or text data content L009C is included in a runtime container image subject to running to define a runtime container. Binary data content M099C as depicted in area 2325 depicts a built container image built by extracting binary data and/or text data content from the container image defined by binary data and/or text data content M00 without further processing to add binary data and/or text data content to the defined container image which can be subject to running to define a runtime container or used as an intermediary image so that extracted binary data and/or text data content L009C is included in runtime container image subject to running to define a runtime container.

Further referring to area 2325, binary data and/or text data content M100C depicts binary data defining a container image having extracted binary data and/or text data content of a first stored container image and a second stored container image; namely, the first stored container image defined by binary data and/or text data content M001C and the second stored container image defined by binary data and/or text data content M002C. The container image defined by binary data and/or text data content M100C can include extracted binary data and/or text data content L009C extracted from the stored container image defined by binary data and/or text data content M001C and can also include extracted binary data and/or text data content L014C extracted from the stored container image defined by container image binary content M002C. The built container image defined by binary data and/or text data content M100C can be subject to running by container run process 138 to define a runtime container. The container image defined by binary data and/or text data content M100C can be identified by the identifier M002 in decision data structure 2323. The new container image M100C provided by extracting binary data and/or text data content from the container image specified by the container image M001 and extracting binary data and/or text data content from the container image specified by the container image M002 can alternatively be used as an intermediary image and subject to further processing so that the binary data and/or text data content L009C and/or binary data and/or text data content L014C is included in a runtime container image subject to running to define a runtime container.

Embodiments herein recognize that multiple variations are possible. As set forth herein, for example, a newly built container image built using container build process 137 as set forth herein can include binary data and/or text data content extracted from one or more stored container images as well as customized content, e.g. one or more additional layer defined by administrator user defined configuration data defined using an administrator user interface.

Embodiments herein recognize that content defining container images can be subject to extraction and/or combining with content defining one or more additional stored container image and still retain functionality. The functionality can include functionality to serve as a designated runtime container image that can be subject to a container run process to provide a runtime container. Embodiments herein therefore can feature lightweight manipulations of binary data and/or text data content of one or more stored container image to build one or more new container image that can serve as a container image subject to running to define a runtime container. The manipulations involving binary data and/or text data content can be lightweight and resource conserving relative to alternative processes involving, e.g. downloading of large container images from a central container image repository 140 and other processes such as use of a complicated container image build file referencing multiple container images for download and requiring extensive testing and debugging processes. Where embodiments herein feature use of container image build files such container image build files can include "atomic action" commands as set forth herein which can reduce processing overhead associated with use of container image build files.

Embodiments herein can facilitate for example expanded usages for large container images that can be stored in container image area 2324 of container host node 130. For example, large container images having multiple layers can facilitate building of new container images referencing only one or a limited number of layers of the large container image. Thus, embodiments herein can improve system memory utilization of container host node 130. For example, because layer content can be extracted from a large container image having the layer content can alleviate a need associated with an alternative approach wherein single layer container images or a limited layer container images are stored separately in container image area 2324 consuming additional memory space.

Container host node 130 for performing extracting process 135 can execute one or more atomic action for performance of extracting of binary data and/or text data content from a container image. Examples of atomic actions for performing container image extracting commands such as, a "first" atomic action, a "rest" atomic action, a "subtract" atomic action and/or an "intersect" atomic action. Such atomic actions can have associated rules as are set forth herein. The atomic actions can be encoded as executable commands using a compiled code programming language. Further, such atomic actions can include associated scripting language commands that map to underlying compiled code encoded commands. The scripting language commands can be deployed together with legacy commands of a container image build file, e.g. a DOCKERFILE™ in a DOCKER® container development platform.

Container host node 130 running combining process 136 can execute one or more atomic action for combining container images based on binary data and/or text data content of two or more container images. A combining atomic action can include, e.g. a "merge" command which can have associated rules associated therewith. A "merge" command can be encoded using a compiled code programming language. A "merge" command can have associated therewith an associated scripting language command that maps to the underlying compiled programming encoded command. The scripting language commands can be deployed together with legacy commands of a container image build file, e.g. a DOCKERFILE™ in a DOCKER® development platform. Container host node 130 can have associated executable code and libraries for supporting running of container image registry provisioning process 134, extracting process 135, combining process 136, container build process 137, and container run process 138.

Further aspects of container image registry provisioning process 134 are herein now described with reference to Table A illustrating example data that can be obtained and processed for use in provisioning container image registry 2322 to include layer structure data that specifies attributes of layers that form the constituent parts of a certain container image.

As set forth herein, new container images according to one embodiment can include use of a container image build file that can be processed by container build process 137 to build a container image. In authoring a build file, an administrator user can specify a sequence of commands wherein each command creates a layer. An example build file is illustrated in Table A.

TABLE A

FROM centos: 10.02
COPY . /app
RUN make/app
CMD python/app/app.py.

The container image build file of Table A includes four commands, each of which creates a layer. The from statement starts out by creating a layer from the "centos:10.02" image. The container image "image centos:10.02" can refer to a layer specific image stored on central container image repository 140. The "COPY" command adds some files from a local directory. The "RUN" command builds a custom application using the "MAKE" command. The "CMD" command specifies a command set to run within the container. From time-to-time administrator users can author such container image build files and can run such build files to build container images, which images can be stored in container image area 2324 of container image repository 132. Embodiment herein recognize drawbacks to existing usages of build files to build container images. As the application supported by the defined container image become more detailed, a container image build file for implementing a container image build can require multiple downloads of multiple images from container image area 2404 of central container image repository 140 rendering the building resulting in a build process that is time-consuming and susceptible to error. If there are errors in the build file, multiple container images (often copies of the same image) can be downloaded during the debugging process.

For facilitation of various features that are set forth herein according to one embodiment, container host node 130 can be configured so that when a new container image build file for use in building a new container image includes a certain command previously used in a prior container image build file and referencing an image previously referenced in a prior container image build file from which a first container image has been built, the resulting layer resulting from execution of the certain command can be given a layer ID and directory of the first container image resulting from execution of a command corresponding to the certain command. Accordingly, common layers between container images can share layer directories and layer IDs, making targeted content of container images, e.g. common content between container images easier to identify.

A container image according to one embodiment can include an ordered collection of root file system changes and the corresponding execution parameters for use within a container runtime. A container image according to one embodiment can include a union of layered file systems stacked on top of each other. A container image according to one embodiment may not have state and may not change. A layer according to one embodiment can include a DIFF file set relative to a parent layer. A DIFF file set defining a layer can include according to one embodiment content modifying a parent layer, e.g. by addition, updating or deleting. A DIFF file set defining a layer can include according to one embodiment content modifying a parent layer e.g. adding first new file(s) F1, updating content of second file(s) F2 of a parent layer, deleting third file(s) F3 of a parent layer. Where a DIFF file set includes e.g. a jar file or executable file, then the DIFF file set can comprise binary data. Where a DIFF file set includes e.g. text based file content such as text-based configuration file content, then the DIFF file set can comprise text data.

To provide data on a layer structure of a given container image that has been built container host node 130 running container image registry provisioning process 134 can run a process for returning list of layer IDs associated to a container image using one or more command available with use of a container development platform. For example, using the DOCKER® container development platform, container host node 130 can return a list of container layer IDs using a sequence of commands.

Table B sets forth a sample command list output returned by subjecting a specified container image to a command history recall process. In the case a DOCKER® container platform is used, the command list of Table B can be returned for a given container image can be returned using a [history] command available in DOCKER®.

return the command history list of Table B in response to executing the following illustrative [history] command using the DOCKER® platform: Run [docker history mongo—no-trunc|awk-F'"{$1=$2=$3=$4=""; print $0}']. In Table B, each line of output corresponds one layer of the MONGO™ image.

Table C illustrates output data that can be returned using command list history data as set forth in Table B. In Table C there is output layer ID list for a container image having a container ID and command lists associated to the various layers. Container host node 130 can return the layer ID list of Table C in response to executing an [inspect] command of the Table B command list using the DOCKER® container development platform. Container host node 130 can update

TABLE B

> /bin/sh -c #(nop) CMD ["mongod"] 0B
> /bin/sh -c #(nop) EXPOSE 27017/tcp 0B
> /bin/sh -c #(nop) ENTRYPOINT ["docker-entrypoint.sh"] 0B
> /bin/sh -c #(nop) COPY
file:18c5d9b642a89adf49e037d95a9e7de6b60557c77e049c9652605cf9cba57df9
in /usr/local/bin/ 10.4kB
> /bin/sh -c #(nop) VOLUME [/data/db /data/configdb] 0B
> /bin/sh -c mkdir -p /data/db /data/configdb && chown -R mongodb:mongodb
/data/db /data/configdb 0B
> /bin/sh -c set -x && apt-get update && apt-get install -y
$ {MONGO_PACKAGE}=$MONGO_VERSION ${MONGO_PACKAGE}-
server=$MONGO_VERSION ${MONGO_PACKAGE}-
shell=$MONGO_VERSION ${MONGO_PACKAGE}-
mongos=$MONGO_VERSION ${MONGO_PACKAGE}-
tools=$MONGO_VERSION && rm -rf /var/lib/apt/lists/* && rm -rf
/var/lib/mongodb && my /etc/mongod.conf /etc/mongod.conf.orig 278MB
> /bin/sh -c echo "deb http://$MONGO_REPO/apt/debian
jessie/${MONGO_PACKAGE%-unstable}/$MONGO_MAJOR main" | tee
"/etc/apt/sources.list.d/${MONGO_PACKAGE%-unstable}.list" 67B
> /bin/sh -c #(nop) ENV MONGO_VERSION=3.6.3 0B
> /bin/sh -c #(nop) ENV MONGO_MAJOR=3.6 0B
> /bin/sh -c #(nop) ENV MONGO_PACKAGE=mongodb-org
MONGO_REPO=repo.mongodb.org 0B
> /bin/sh -c #(nop) ARG MONGO_REPO=repo.mongodb.org 0B
> /bin/sh -c #(nop) ARG MONGO_PACKAGE=mongodb-org 0B
> /bin/sh -c set -ex; export GNUPGHOME="$(mktemp -d)"; for key in
$GPG_KEYS; do gpg --keyserver ha.pool.sks-keyservers.net --recv-keys
"$key"; done; gpg --export $GPG_KEYS > /etc/apt/trusted.gpg.d/mongodb.gpg;
rm -r "$GNUPGHOME"; apt-key list 1.16kB
> /bin/sh -c #(nop) ENV
GPG_KEYS=2930ADAE8CAF5059EE73BB4B58712A2291FA4AD5 0B
> /bin/sh -c mkdir /docker-entrypoint-initdb.d 0B
> /bin/sh -c set -ex; apt-get update; apt-get install -y --no-install-recommends
wget ; rm -rf /var/lib/apt/lists/*; dpkgArch="$(dpkg --print-architecture | awk -
F- '{ print $NF }')"; wget -O /usr/local/bin/gosu
"https://github.com/tianon/gosu/releases/download/$GOSU_VERSION/gosu-
$dpkgArch"; wget -O /usr/local/bin/gosu.asc
"https://github.com/tianon/gosu/releases/download/$GOSU_VERSION/gosu-
$dpkgArch.asc"; export GNUPGHOME="$(mktemp -d)"; gpg --keyserver
ha.pool.sks-keyservers.net --recv-keys
B42F6819007F00F88E364FD4036A9C25BF357DD4; gpg --batch --verify
/usr/local/bin/gosu.asc /usr/local/bin/gosu; rm -r "$GNUPGHOME"
/usr/local/bin/gosu.asc; chmod +x /usr/local/bin/gosu; gosu nobody true; wget -
O /js-yaml.js "https://github.com/nodeca/js-
aml/raw/${JSYAML_VERSION}/dist/js-yaml.js"; apt-get purge -y --auto-
remove wget 2.48MB
> /bin/sh -c #(nop) ENV JSYAML_VERSION=3.10.0 0B
> /bin/sh -c #(nop) ENV GOSU_VERSION=1.10 0B
> /bin/sh -c apt-get update && apt-get install -y --no-install-recommends ca-
certificates jq numactl && rm -rf /var/lib/apt/lists/* 6.4MB
> /bin/sh -c groupadd -r mongodb && useradd -r -g mongodb mongodb 330kB
> /bin/sh -c #(nop) CMD ["bash"] 0B
> /bin/sh -c #(nop) ADD
file:080bac9a2cdcc70ad61e50045a26172f0e1acfd3a26360cb86b6e26a3307b2e1
in / 79.1MB Table B illustrates sample history command list data provided using a MONGO™ platform. (MONGO™ is a trademark of Mongo D B, Inc.). Container host node 130 can container image registry 2322 to include the obtained layer ID list for a given container image on the return of the layer ID list. In one embodiment container host node 130 can be configured to automatically run a process to return a layer ID list in response to a building of a container ID. In one embodiment container host node 130 can be configured to automatically run a process to return a layer ID list on demand in response to an administrator user defined command.

TABLE C

| Layer ID | Command List |
|---|---|
| bcbe43405751 | /bin/sh -c #(nop) COPY file:a4f750618f51f00d2f8268ac43fdd8d8ef5ce16e1d412afa5a9bc7492a5d975f in /usr/local/bin/install-plugins.sh 7.59kB |
| 61c06e07759a | /bin/sh -c #(nop) COPY file:9f0a7faf8951842e0f42c1a3f3bb54ff4ec5263064508077347c57376da68b46 in /usr/local/bin/plugins.sh 3.96kB |
| 20c527f217db | /bin/sh -c #(nop) COPY file:1a774b24a2bbd880e2ce47b3d642b8c04bbdbede0f2256dbdb11f62b65f696ba in /usr/local/bin/jenkins.sh 1.23kB |
| 0ef6a87794b5 | /bin/sh -c #(nop) COPY file:26c3c5818bc87662d1f4905a3ed73bd55a0a75f731c7dc52d0599c00f51408e9 in /usr/local/bin/jenkins-support 5kB |
| 638babc3b650 | \|8 JENKINS_SHA=2d71b8f87c8417f9303a73d52901a59678ee6c0eefcf7325efed6035ff39372a JENKINS_URL=https://repo.jenkins-ci.org/public/org/jenkins-ci/main/jenkins-war/2.60.3/jenkins-war-2.60.3.war agent_port=50000 gid=1000 group=jenkins http_port=8080 uid=1000 user=jenkins /bin/sh -c chown -R ${user} "$JENKINS_HOME" /usr/share/jenkins/ref 328B |
| 7e912d203101 | \|8 JENKINS_SHA=2d71b8f87c8417f9303a73d52901a59678ee6c0eefcf7325efed6035ff39372a JENKINS_URL=https://repo.jenkins-ci.org/public/org/jenkins-ci/main/jenkins-war/2.60.3/jenkins-war-2.60.3.war agent_port=50000 gid=1000 group=jenkins http_port=8080 uid=1000 user=jenkins /bin/sh -c curl -fsSL ${JENKINS_URL} -o /usr/share/jenkins/jenkins.war && echo "${JENKINS_SHA}/usr/share/jenkins/jenkins.war" \| sha256sum -c - 70.6MB |
| 21087b7b28f7 | /bin/sh -c #(nop) COPY file:c629bc0b9ecb5b7233000c973f65721df4ce1307a5d5b33ac3871ff61a9172ff in /usr/share/jenkins/ref/init.groovy.d/tcp-slave-agent-port.groovy 328B |
| 46da922b5615 | \|6 agent_port=50000 gid=1000 group=jenkins http_port=8080 uid=1000 user=jenkins /bin/sh -c curl -fsSL https://github.com/krallin/tini/releases/download/v${TINI_VERSION}/tini-static-amd64 -o /bin/tini && chmod +x /bin/tini && echo "$TINI_SHA /bin/tini" \| sha256sum -c - 822kB |
| 213d69d0252d | \|6 agent_port=50000 gid=1000 group=jenkins http_port=8080 uid=1000 user=jenkins /bin/sh -c groupadd -g ${gid} ${group} && useradd -d "$JENKINS_HOME" -u ${uid} -g ${gid} -m -s /bin/bash ${user} 334kB |
| 48ef3a9a0282 | /bin/sh -c apt-get update && apt-get install -y git curl && rm -rf /var/lib/apt/lists/* 2.8MB |
| 3170d5508f72 | /bin/sh -c /var/lib/dpkg/info/ca-certificates-java.postinst configure 394kB |
| 34d9841a9a3a | /bin/sh -c set -ex; if [ ! -d /usr/share/man/man1 ]; then mkdir -p /usr/share/man/man1; fi; apt-get update; apt-get install -y openjdk-8-jdk="$JAVA_DEBIAN_VERSION" ca-certificates-java="$CA_CERTIFICATES_JAVA_VERSION" ; rm -rf /var/lib/apt/lists/*; [ "$(readlink -f "$JAVA_HOME")" = "$(docker-java-home)" ]; update-alternatives --get-selections \| awk -v home="$(readlink -f "$JAVA_HOME")" 'index($3, home) == 1 { $2 = "manual"; print \| "update-alternatives --set-selections" }'; update-alternatives --query java \| grep -q 'Status: manual' 450MB |
| faf4a2ffcb34 | /bin/sh -c ln -svT "/usr/lib/jvm/java-8-openjdk-$(dpkg --print-architecture)" /docker-java-home 33B |
| d5cba391afc6 | /bin/sh -c { echo '#!/bin/sh'; echo 'set -e'; echo; echo 'dirname "$(dirname "$(readlink -f "$(which javac \|\| which java)")")"'; } > /usr/local/bin/docker-java-home && chmod +x /usr/local/bin/docker-java-home 87B |
| 9b92cc4880e5 | /bin/sh -c apt-get update && apt-get install -y --no-install-recommends bzip2 unzip xz-utils && rm -rf /var/lib/apt/lists/* 2.21MB |
| d6ac621dd0cf | /bin/sh -c apt-get update && apt-get install -y --no-install-recommends bzr git mercurial openssh-client subversion procps && rm -rf /var/lib/apt/lists/* 142MB |
| 5049836db291 | /bin/sh -c set -ex; if ! command -v gpg > /dev/null; then apt-get update; apt-get install -y --no-install-recommends gnupg dirmngr ; rm -rf /var/lib/apt/lists/*; fi 7.8MB |
| c58d945697ee | /bin/sh -c apt-get update && apt-get install -y --no-install-recommends ca-certificates curl wget && rm -rf /var/lib/apt/lists/* 23.8MB |

TABLE C-continued

| Layer ID | Command List |
|---|---|
| 03bb990aa49e | /bin/sh -c #(nop) ADD file:b380df301ccb5ca09f0d7cd5697ed402fa55f3e9bc5df2f4d489ba31f28de58a in / 100MB |

Figure 2:
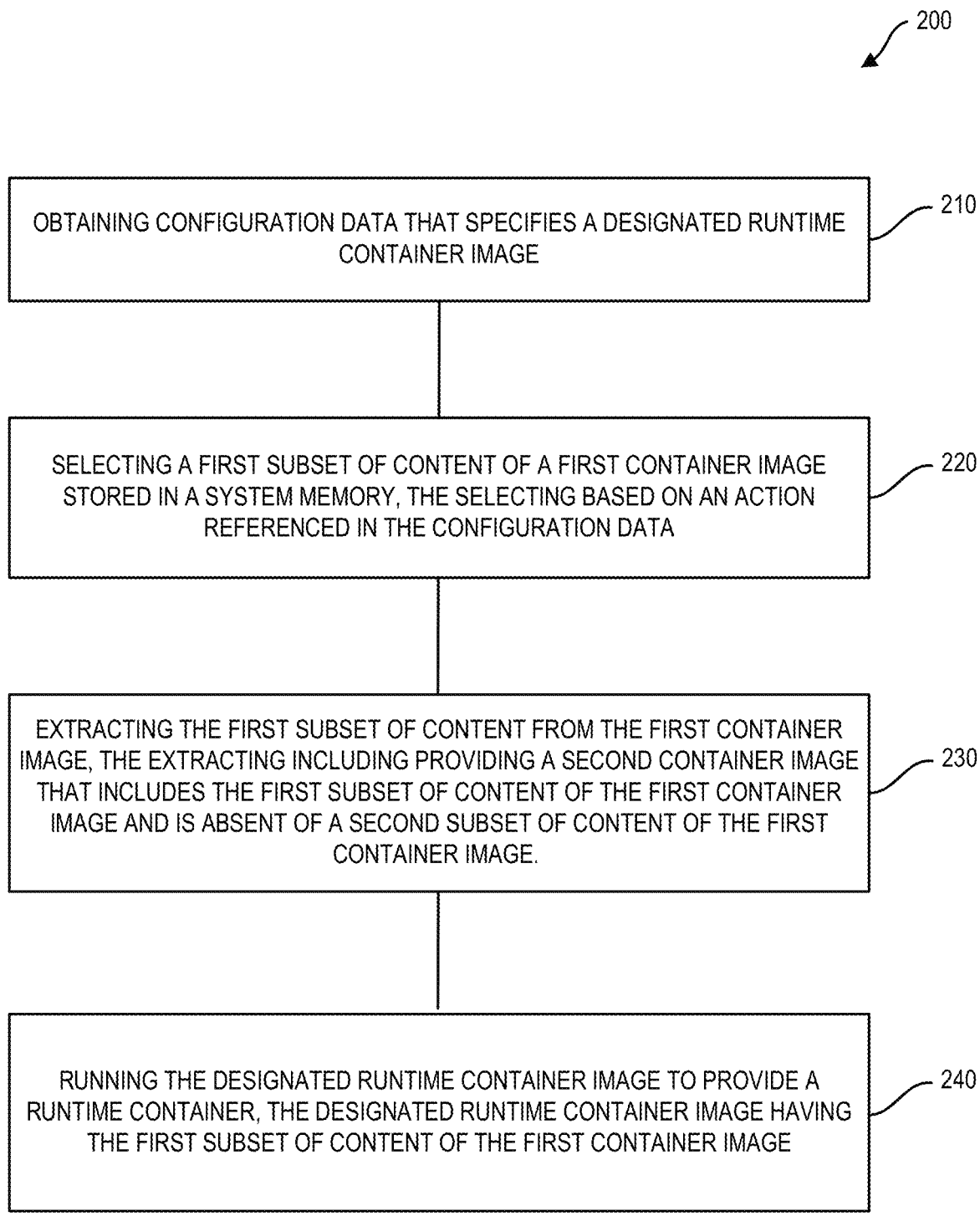
FIG. 2 is a flowchart illustrating method that can be performed by container host node according to one embodiment.

Container host node 130 according to one embodiment can perform method 200 as set forth in the flowchart of FIG. 2. At block 210 container host node 130 can perform obtaining configuration data that specifies a designated runtime container image. At block 220 container host node 130 can perform selecting a first subset of content of a first container image stored in a system memory, the selecting based on an action referenced in the configuration data; At block 220 container host node 130 can perform extracting the first subset of content from the first container image, the extracting including providing a second container image that includes the first subset of content of the first container image and is absent of a second subset of content of the first container image. At block 240 container host node 130 can perform running the designated runtime container image to provide a runtime container, the designated runtime container image having the first subset of content of the first container image.

Figure 3:
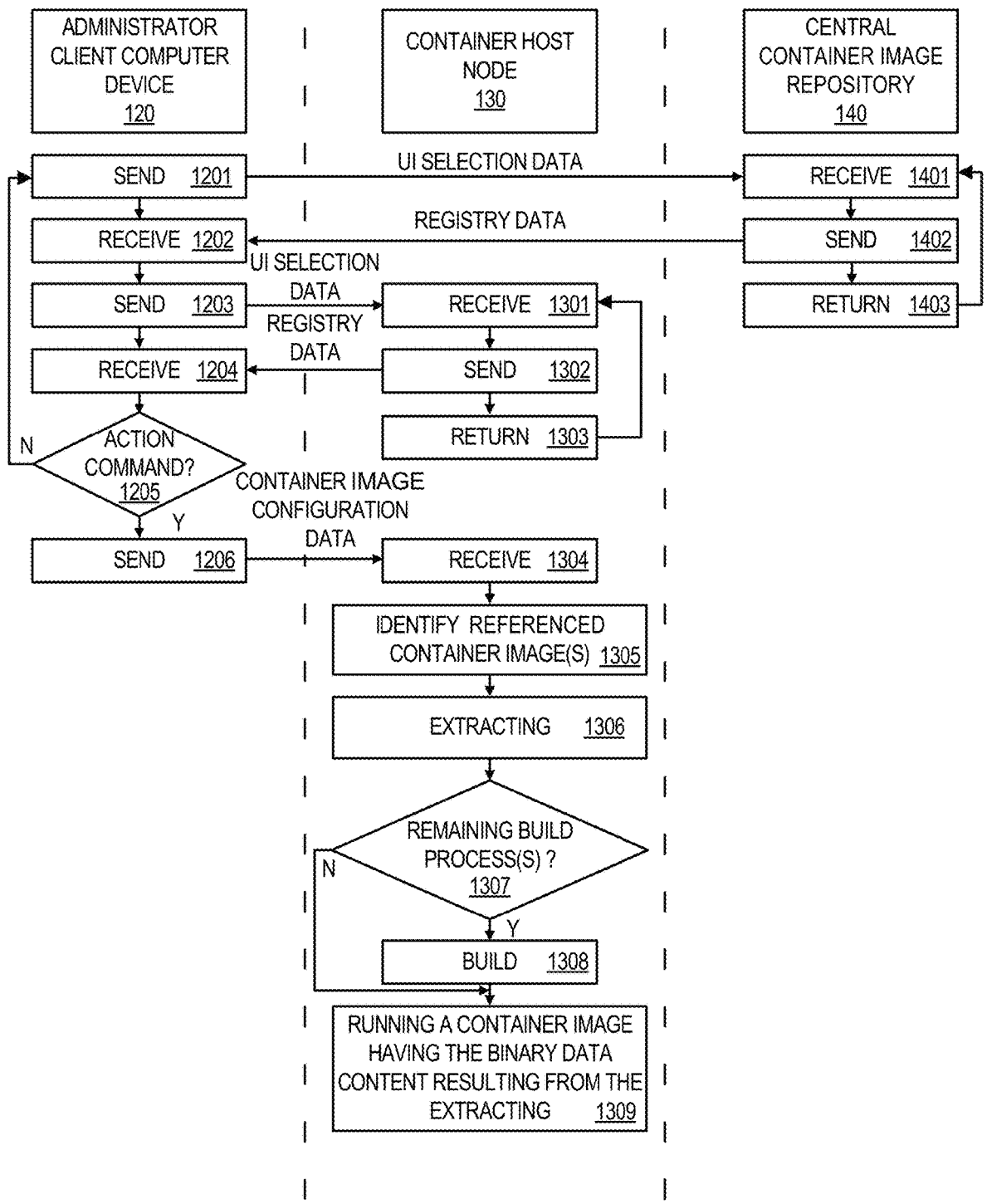
FIG. 3 is a flowchart depicting a method that can be performed by a container host node interoperating with an administrator client computer device and a central container image repository according to one embodiment.

A particular example of a container host node performing method 200 as set forth in FIG. 2 is described with reference to the flowchart of FIG. 3, illustrating container host node 130A interoperating with administrator client computer device 120 and central container image repository 140.

Referring to FIG. 3 administrator client computer device 120 according to one embodiment during performance of blocks 1201-1206 can be displaying on an administrator user interface displayed on a display of administrator client computer device 120. Administrator user interface 400 can display registry data from both container image registry 2402 of central container image repository 140 and from container image registry 2322 of container image repository 132 of container host node 130.

Figure 4:
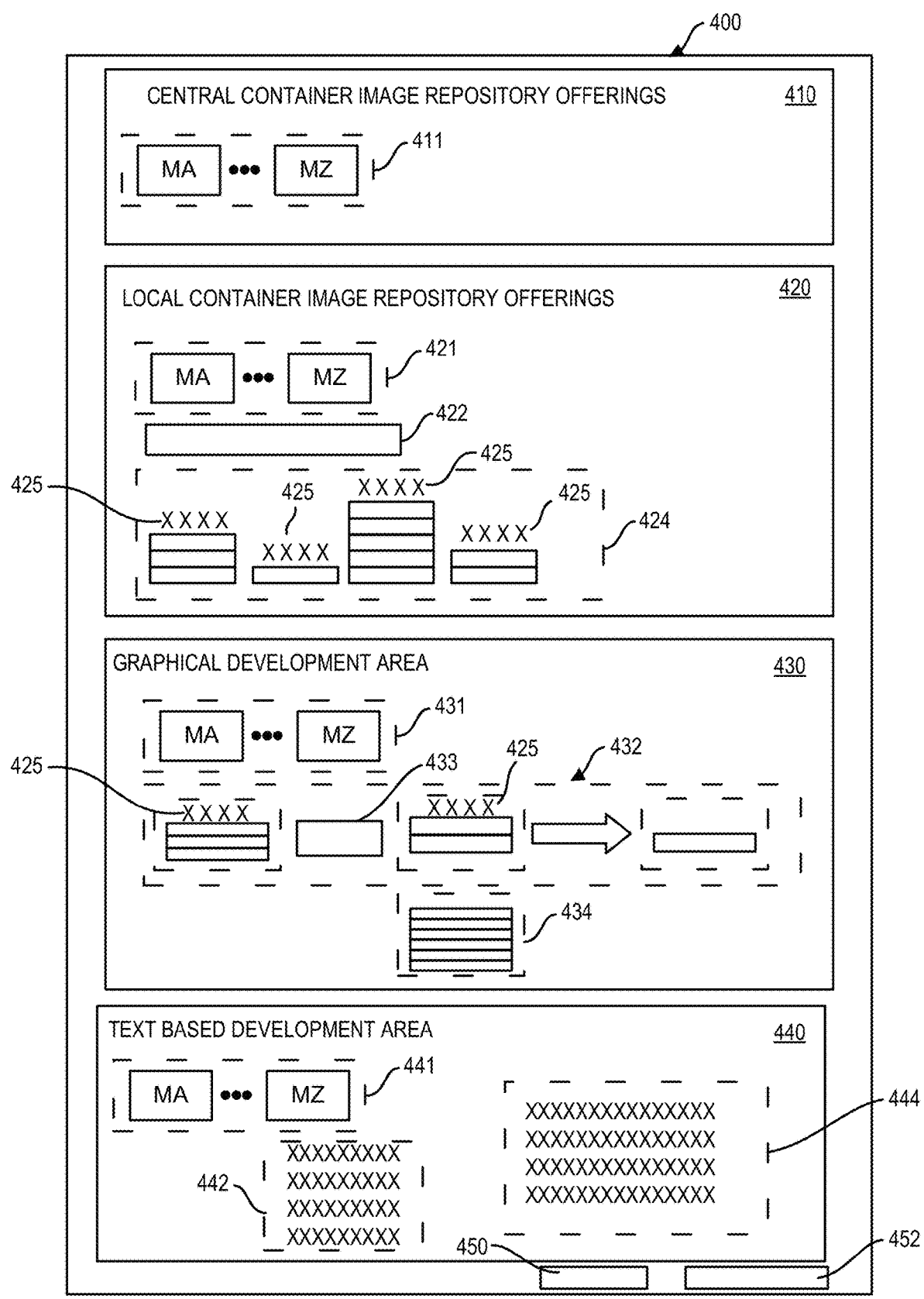
FIG. 4 depicts an administrator user interface according to one embodiment.

Referring to FIG. 4, an administrator user can use administrator user interface 400 to define configuration data that specifies container image that can be built and/or run. In area 410 administrator user interface 400 can display menu indicators 411 indicating content of container images available from central container image repository 140. An administrator user can use area 410 to, for example, check for updates on container images, review metadata associated to container images stored in container image area 2404, and/or can view sample container image build files used to build container images. Using area 420 of administrator user interface 400 an administrator can view indicators of content of container images available from container image area 2324 of container image repository 132 of container host node 130. Within area 420 there can be included area 421 which can display menu indicators of container images, e.g. file titles and/or other metadata indicating layer structure associated with container images stored in container image area 2324. In area 424 of area 420, an administrator can enter text specifying a search for a certain container image layer. In area 424 administrator user interface 400 can display graphical indicators having the one or more layer specified in search area 422. During use of area 410 displaying central container image repository registry data and area 420 displaying container host node registry data, administrator client computer device 120 at blocks 1201 and 1203 respectively can be sending user interface selection data for receipt by central container image repository at block 1401 and to container host node 130 for receipt at block 1301.

In response to administrator user interface selection data at block 1401, central container image repository 140 at block 1402 can send updated registry data for receipt by administrator client computer device 120 at block 1202. Administrator client computer device 120 can responsively display the updated registry data. In response to received user interface selection data at block 1301, container host node 130 can responsively send registry data to administrator client computer device 120 at block 1204. Container host node 130 can responsively send the updated registry data at block 1302. In response to receipt of the updated registry data at block 1204, administrator client computer device 120 can responsively display the updated registry data. As indicated by return block 1403 and return block 1303, central container image repository 140 and container host node 130 can iteratively respond to newly received user interface selection data defined by administrator user to iteratively update registry data displayed on administrator user interface 400 of administrator client computer device 120 to update data including selectable options, selectable by administrator user using administrator user interface 400.

Referring further to administrator user interface 400, area 424 can include graphical container images that are stored in container image area 2324 of container image repository 132. The graphical depictions can be displayed with labels 425 that specify container image IDs having searched for layers. The graphical depictions displayed in area 424 can also display labels that specify layer IDs associated with the layers included in each depicted graphical representation of a container image. In one embodiment area 424 can depict not only graphical representations of container images having associated binary data and/or text data content stored in container image area 2324, but also virtual container images that container host node 130 determines can be theoretically built by container host node 130 using one or more of extracting process 135 or combining process 136.

Referring to another aspect of container image registry provisioning process 134, container host node 130 can run container image registry provisioning process 134 according to one embodiment to iteratively generate a set of container image of virtual container image profiles of container images that can be built by container host node 130 using one or more of extracting process 135 and/or combining process 136. In that the virtual container images need not include content that can define an entire content of an operational container image (e.g. that can serve as an intermediary image and/or a designated runtime container image), the virtual container images can be lightweight and in one embodiment can include sufficient data (e.g. a list) to specify a data structure of a container image that can be built by container host node 130 using one or more of extracting process 135 or combining process 136 and/or another building process.

For generating a list of virtual container images, container host node 130 in response to storing a new container image within container image area 2324 can subject the new container image to atomic actions herein referencing the new container image and one or more prior stored container image stored in container image area 2324 of container image repository 132. The list of virtual container images stored in container image registry 2322 in one embodiment can be comprehensive and can include a comprehensive list of all container images that can be built using one or more of extracting process 135 and/or combining process 136 and in one embodiment can include virtual container images generated using other virtual container images. The list of virtual container images stored in container image registry area 2322 can include tracking data that tracks operations performed to generate the virtual container image (e.g. a specific sequence of atomic actions involving specific container image(s) which can include zero or more intermediary images).

In one embodiment, a list of virtual container images stored in container image registry 2322 can be subject to filtering, e.g. so that only the most likely to be used virtual container images are generated and stored.

Rules associated with various atomic actions are described with reference to FIGS. 5A-5K. Performing atomic actions, container host node 130 can extract binary data and/or text data content from a container image. Container host node 130 can extract binary data and/or text data content from a first container image and use the extracted binary data and/or text data content to provide a new container image. According to one embodiment, the new container image can define a designated runtime container image can be run to define a runtime container. In another embodiment, the new container image can be subject to further processing for the establishing of the designated runtime container image that includes the extracted binary data and/or text data content of the first container image.

For extracting the binary data and/or text data content from a container image, container host node 130 can use layer ID list data for a container image as set forth in Table C, and to identify system memory locations for binary data for any layer can execute a file data search command. For example, container host node 130 executing a file data search command to locate the certain layer identified by <layer id> can return storage driver file directory path information for the certain layer such as provided in (1) below.

/var/lib/docker/aufs/diff/<layer id>    (1)

Container host node 130 for extracting certain binary data and/or text data content from a first container image for providing a new container image having the extracted binary data and/or text data content can for example select a first subset of binary data and/or text data content of the first container image and can establish a new container so that the new container image includes the first subset of binary data and/or text data content of the first container image and is absent a second subset of binary data and/or text data content of the first container image. For performing the extracting and establishing the new container image, container host node 130 can provide a new container image directory and for performing the extracting container image host node 130 can store a reference to the first subset of binary data and/or text data content. The reference can include pointer to a directory, e.g. as provided by a first layer directory in which the first subset of binary data and/or text data content. In one embodiment, for performing the extracting, container host node 130 can establish a new subset content directory for storing the first subset of binary data and/or text data content (e.g. a new layer directory) and can copy the first subset of binary data and/or text data content from a first directory e.g. a layer directory associated to the first container image to the new subset content directory. In one embodiment, for performing the extracting, container host node 130 can store in the new container image directory a pointer to the first layer directory, the pointer defining the reference to the first subset of binary data and/or text data content.

Container host node 130 can establish the new container image to emulate the file data formatting of a container image built using a container image build file but is not constrained by processes recognized to be associated with existing use of container image build files. One exemplary difference as noted is that a newly built container image can include binary data and/or text data content extracted from a pre-existing container image which pre-existing container image can have multiple layers. Another exemplary difference is that the new container image can be built in an order so that system memory locations for storing child layers of a container image can be established prior to establishing system memory locations for parent layers.

Container host node 130 accordingly using a container image layer ID list (Table C) can extract any layer specific binary data and/or text data content defining any selected layer of a container image. Container host node 130 can use returned container layer ID list information (Table C) and path information for respective container layers (1) to perform the atomic actions of FIGS. 5A-5K.

Figure 5A:
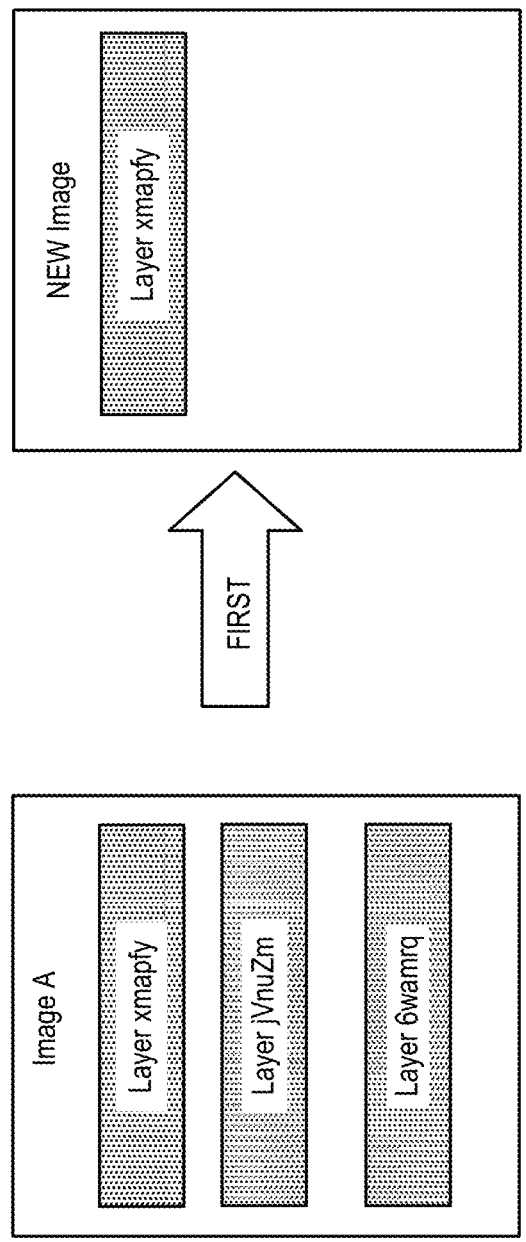
FIGS. 5A-5K are flowcharts illustrating operation of rules associated with the atomic actions according to one embodiment.

FIG. 5A illustrates rules associated with a "first" atomic action according to one embodiment. Referring to FIG. 5A image A defines a subject image subject to a "first" atomic action can return a NEW image container image that includes the top layer of image A and can be absent of additional layers. For providing the NEW image container image of FIG. 5A container host node 130 can extract binary data and/or text data content defining Layer xmapfly (path returned by the process described with reference to (1) herein). Extracting can include copying the binary data and/or text data content defining Layer xmapfly from a first layer directory associated to Image A to a new layer directory established for NEW image or can include another extracting process set forth herein e.g. creating a container image directory for NEW image and storing therein a pointer reference to the first layer directory of Image A. Copying can include reading binary data and/or text data content from the first layer directory associated to Image A and writing the same to a new layer directory associated to NEW image.

Figure 5B:
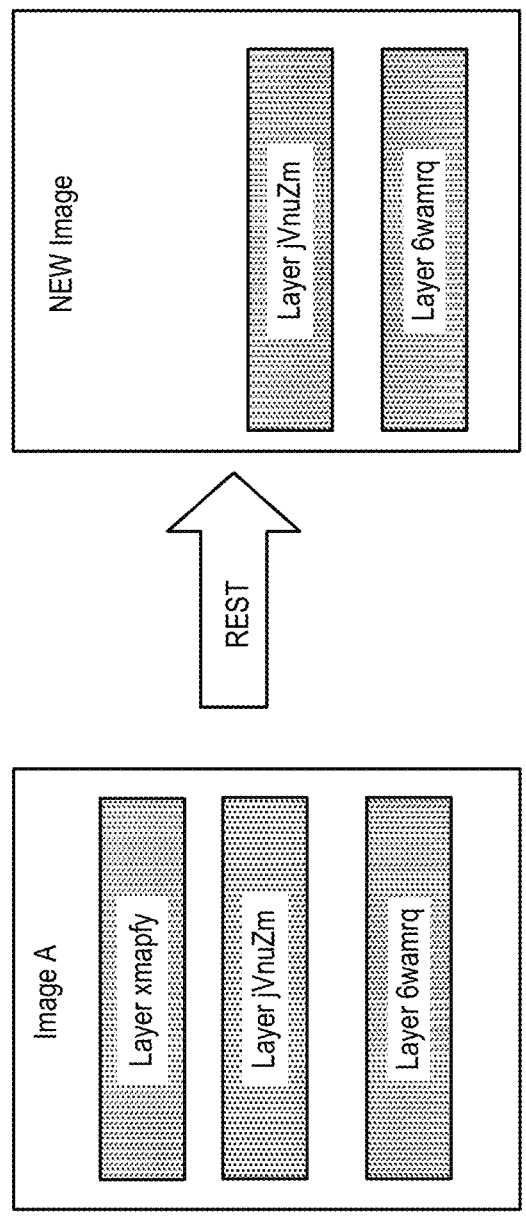

FIG. 5B illustrates rules associated with a "rest" atomic action according to one embodiment. Referring to FIG. 5B image A defines a subject image subject to a "rest" atomic action can return a NEW image container image that includes the layers of Image A except the top layer of Image A. For providing the NEW image container image of FIG. 5B container host node 130 can extract binary data and/or text data content defining Layer jVnuZm and Layer 6wamrq (respective paths returned by the process described with reference to (1) herein). Extracting can include copying the binary data and/or text data content defining Layer jVnuZm and Layer 6wamrq from prior established first layer directories associated to Image A to a new one or more directory established for NEW image or can include another extracting process set forth herein e.g. creating a container image directory for NEW image and storing therein a pointer reference to the first layer directories of Image A. Copying can include reading binary data and/or text data content from the prior established layer directories associated to Image A and writing the same to the new layer directories established for NEW image associated to NEW image. Performing of remaining atomic actions described in connection FIGS. 5A-5K can include extracting binary data and/or text data content from a certain container image including by copying of binary data and/or text data content from a prior established one or more layer directory to a New image one or more layer directory according to the examples of FIGS. 5A-5B or by using another extracting process herein.

Figure 5C:
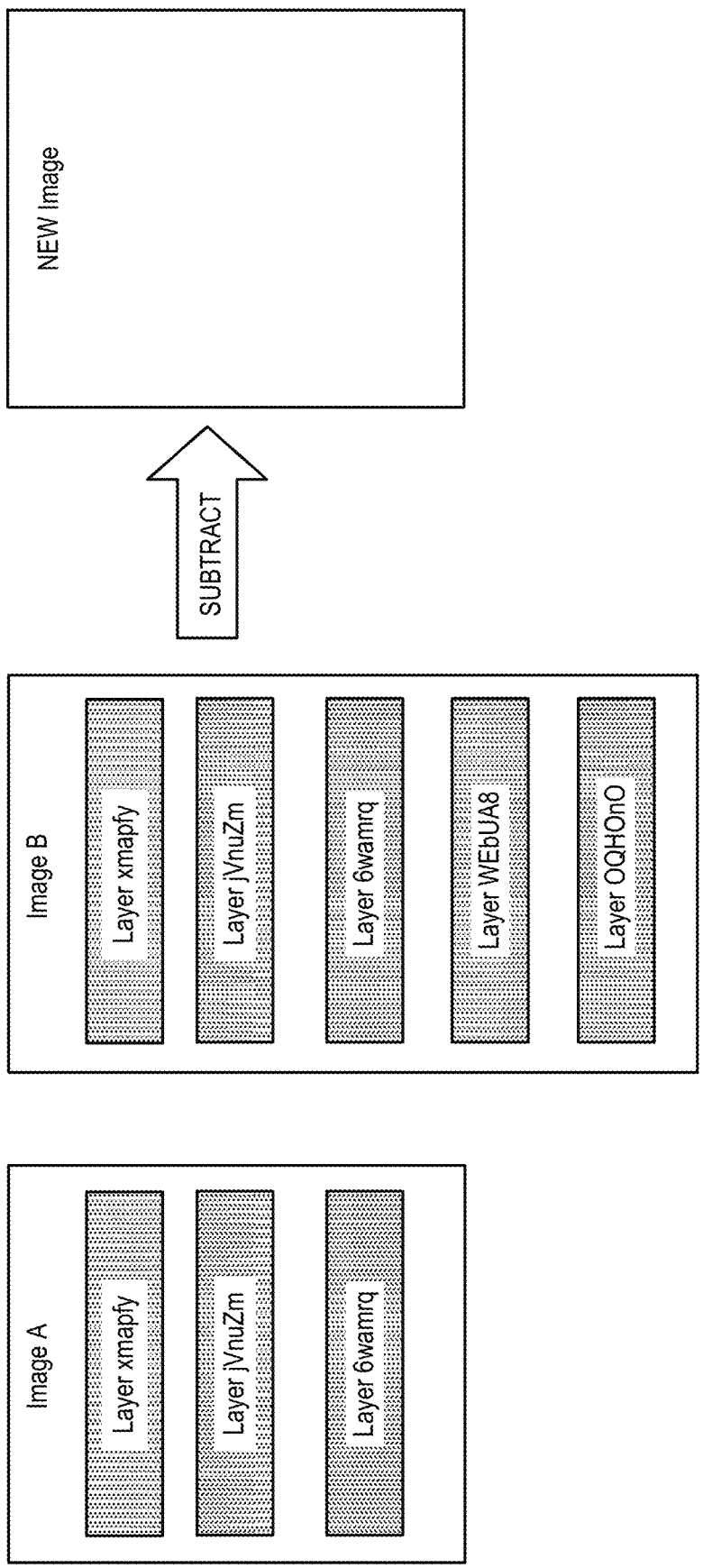
Figure 5D:
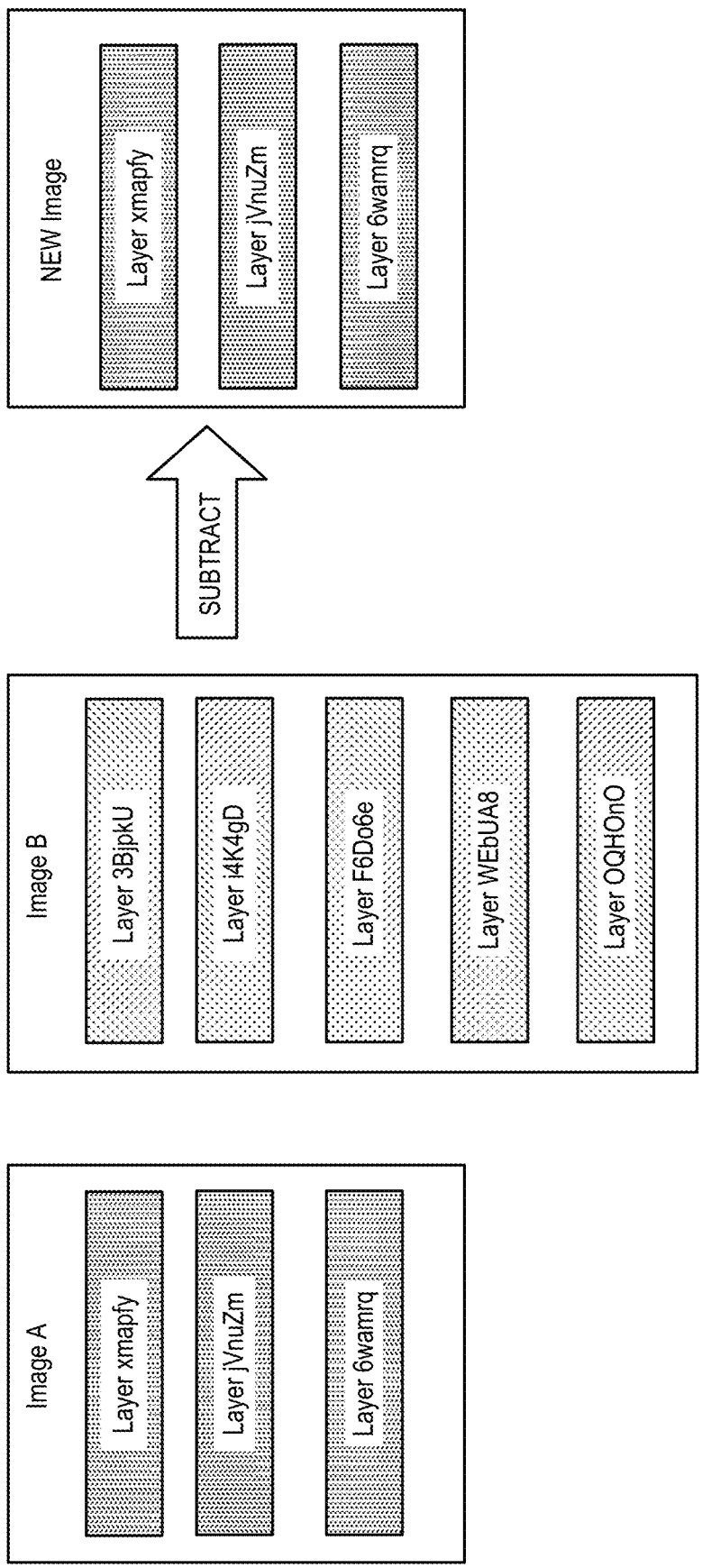
Figure 5E:
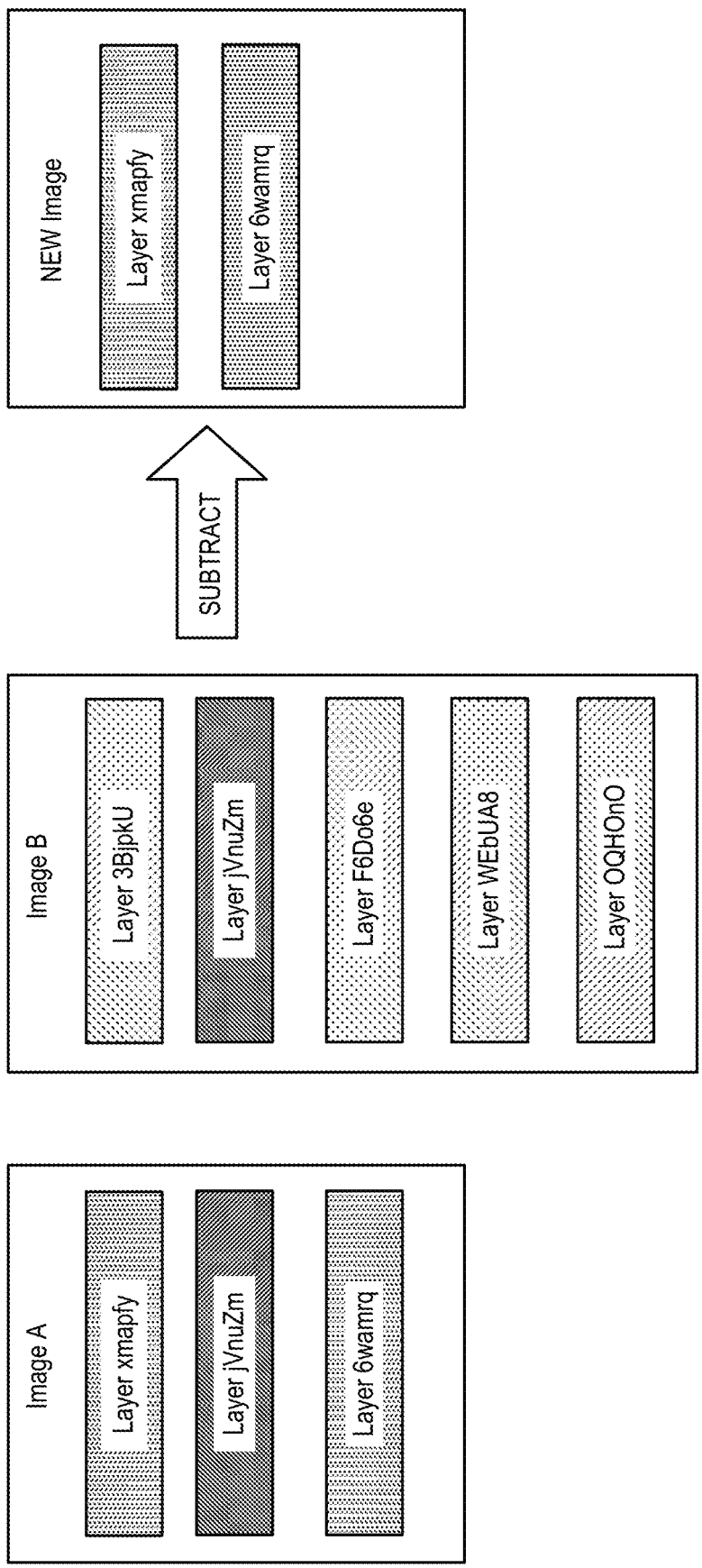

FIGS. 5C-5E illustrate rules associated with a "subtract" atomic action according to one embodiment. Referring to FIG. 5C Image A can be specified as the subject image, Image B can be specified as the operation image, and the atomic action depicted is the "subtract" atomic action. Because the operation container image in the described example has the layers of the subject image (Image A) resulting images as depicted in FIG. 5C is the null image specified as NEW image in FIG. 5C. In the example of FIG. 5D the subject image is Image A, the operation image is specified to be image B, and the atomic action depicted is the "subtract" atomic action. Based on Image B in the described example having no layers in common with the layers according to the layer structure of Image A, the depicted NEW image in the example of FIG. 5D wherein the NEW image includes the content of Image A. Referring to FIG. 5E the subject image is specified to be Image A, the operation image is specified to be Image B, and the atomic action depicted is the "subtract" atomic action. Based on the second layer (layer jVnuZM being the same between the layers) the subtraction atomic action produces the depicted NEW image having the first and third layer of Image A, i.e. results in binary data and/or text data content of container Image A, defining the first layer of Image A and the third layer of Image A being extracted to provide the NEW container image depicted as NEW image in FIG. 5E having extracted content of Image A. It can be seen that the depicted NEW image defines a new container image that can be used by system 100. For example, the depicted NEW image can be used as a built image which can be subject to running to define a runtime container. Also, the NEW image container image as will be set forth in further detail herein can be subject to modification, e.g. with use of further atomic actions according to extracting process 135 and/or combining process 136 and/or administrator user custom atomic actions, e.g. to add additional one or more layers to the NEW image depicted in FIG. 5E prior to running to define a runtime container.

Figure 5F:
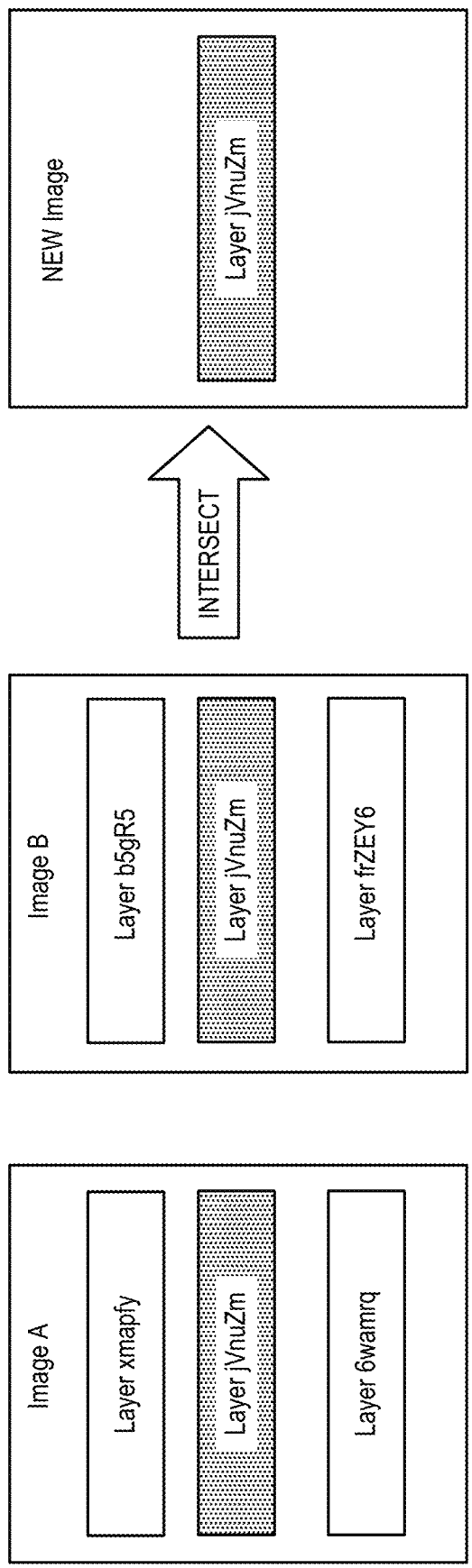
Figure 5G:
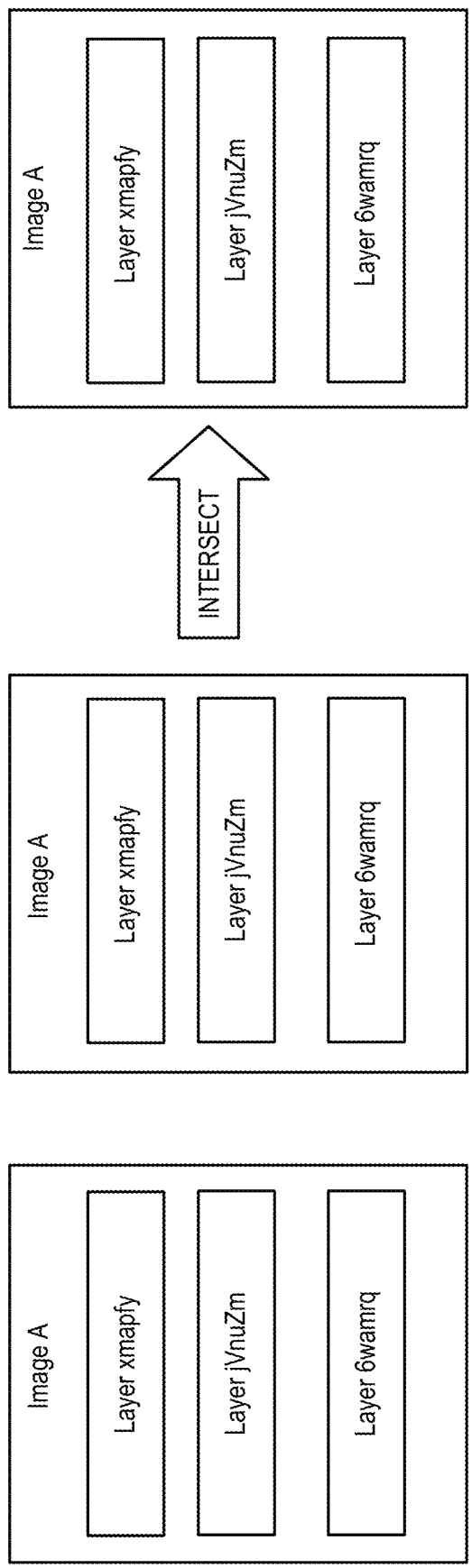
Figure 5H:
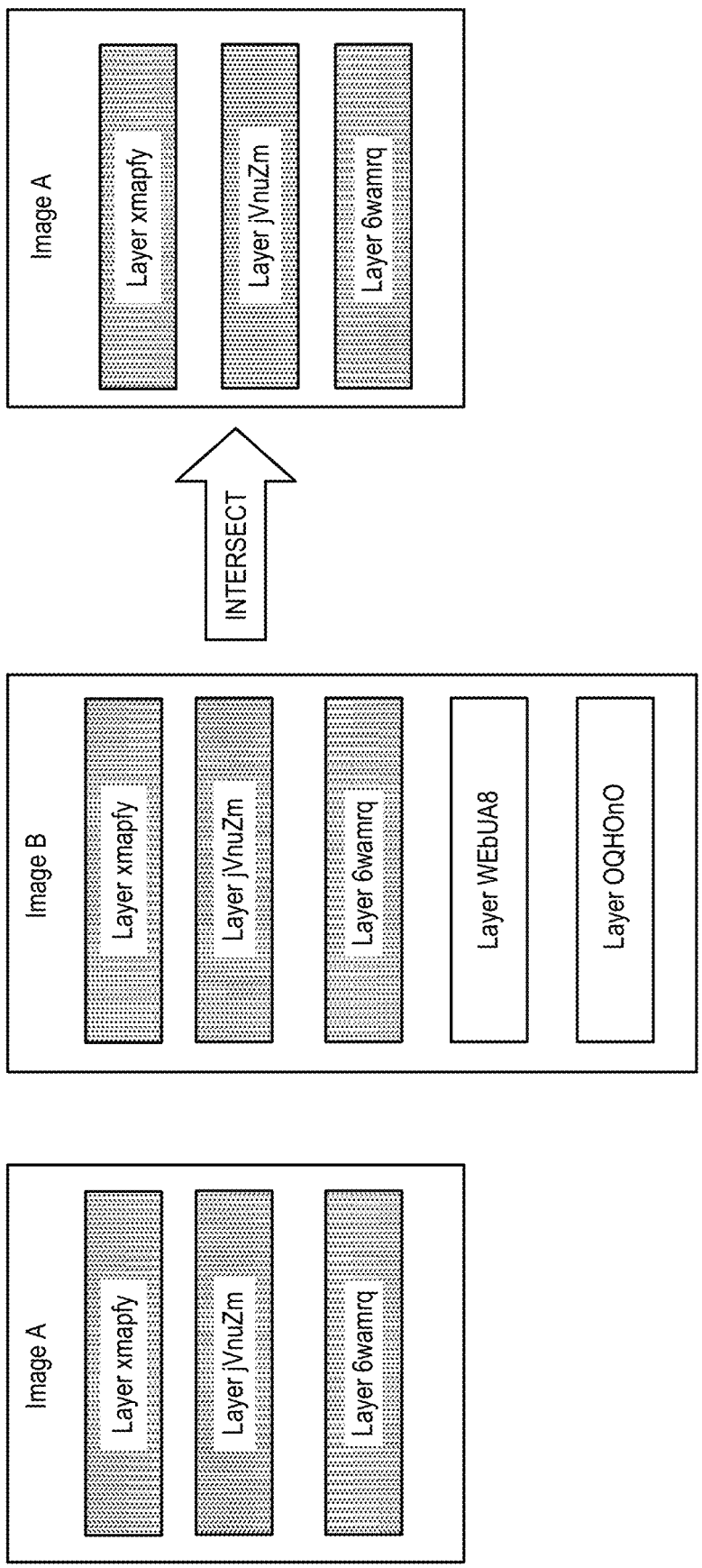

FIGS. 5F-5H illustrate rules associated with an "intersect" atomic action for extraction of layer content from a container image defined by binary data and/or text data content. Referring to FIG. 5F Image A is the subject image, the operation image is specified to be image B, and the atomic action depicted is the "intersect" atomic action. Depicted in FIG. 5F, the operation of an "intersect" atomic action results in layer binary data and/or text data content of Image A being extracted where that layer image content is shared between Image A and Image B. As shown in the example of FIG. 5F, Image A and Image B both have the common layer having the layer ID layer jVnuZm. In accordance with the "intersect" atomic action, a NEW image is output as depicted in FIG. 5F, wherein the NEW image comprises the shared layer content between Image A and Image B. Namely, the binary data and/or text data content defining the layer identified by layer ID layer jVnuZM. Referring further to FIG. 5F, it is seen that in theory binary data and/or text data content defining a single layer of container image can be extracted with use of the "intersect" atomic action, by identifying two container images having the single layer in common as described. In FIG. 5G, Image A is the subject image, the operation image is specified to be Image B, and the atomic action depicted is the "intersect" atomic action. The resulting NEW image from performance of an "intersect" atomic action as specified in FIG. 5G where a common container image is subject to processing by an intersect atomic action, will simply output the common image, i.e. will output all layer content shared between the two images (Image A and Image B). Referring to the example of FIG. 5H, Image A is the subject image, the operation image is specified to be image B, and the atomic action depicted is the "intersect" atomic action. In the example of FIG. 5H, Image B is similar to Image A except includes the additional first and second layers. Namely, the layer identified by the layer ID layer OQHOnO and the layer specified by the layer ID layerWEbUA8. In the described example of FIG. 5H, the NEW image provided by the operation of the intersect atomic action using Image A and Image B will once again be the output image (Image A). In accordance with the intersect atomic action in FIG. 5H, the output image (Image A), will once again comprise shared layer content between the subject image (Image A) and the operation image (Image B). Referring further to FIGS. 5F-5H, it can be seen that the intersect atomic action can be used to extract targeted binary data and/or text data content defining specific layers of a container image.

Figure 5I:
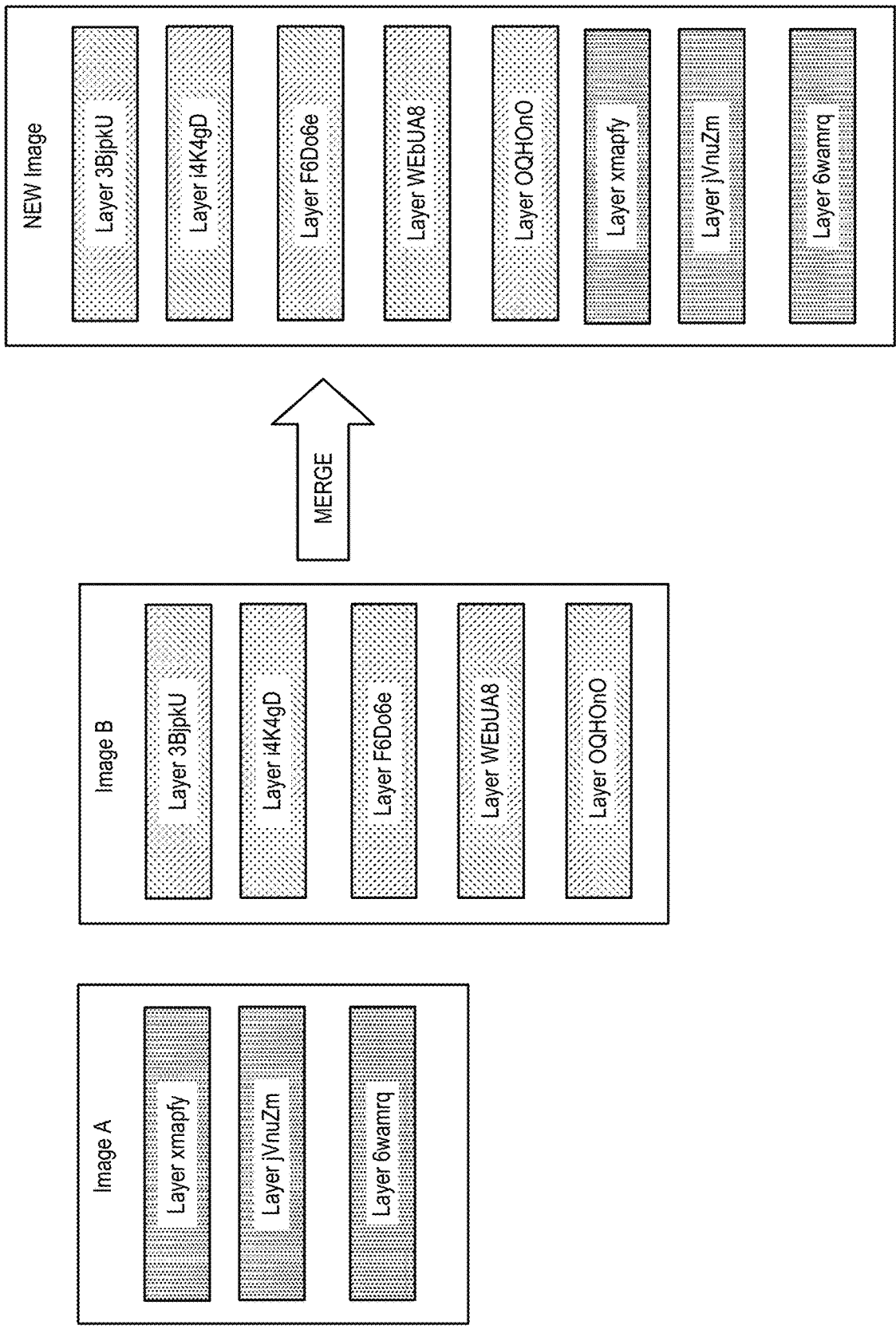

FIGS. 5H-5K illustrate rules associated with an atomic action for performing by combining process 136. Namely, rules associated with a "merge" atomic action. Referring to the example of FIG. 5I, Image A is the subject image, the operation image is specified to be image B, and the command depicted is the "merge" atomic action. In the described example of FIG. 5I, Image A and Image B have no common layers. Accordingly, an output NEW image as depicted in FIG. 5I can comprise simply, layers of Image B combined with the layers of Image A; namely binary data and/or text data content of the Image B layers provided on top of the binary data and/or text data content defining the Image A layers.

Figure 5J:
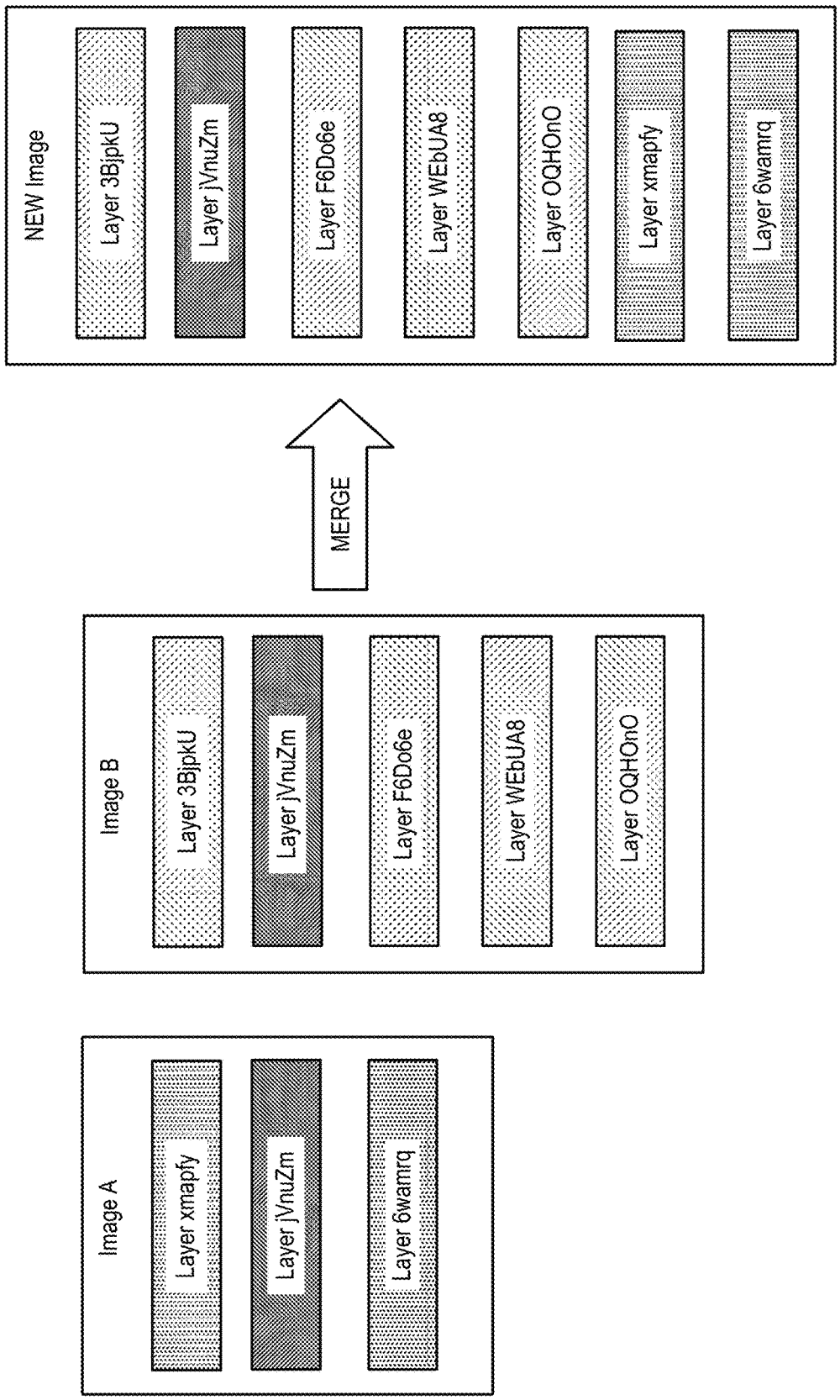
Figure 5K:
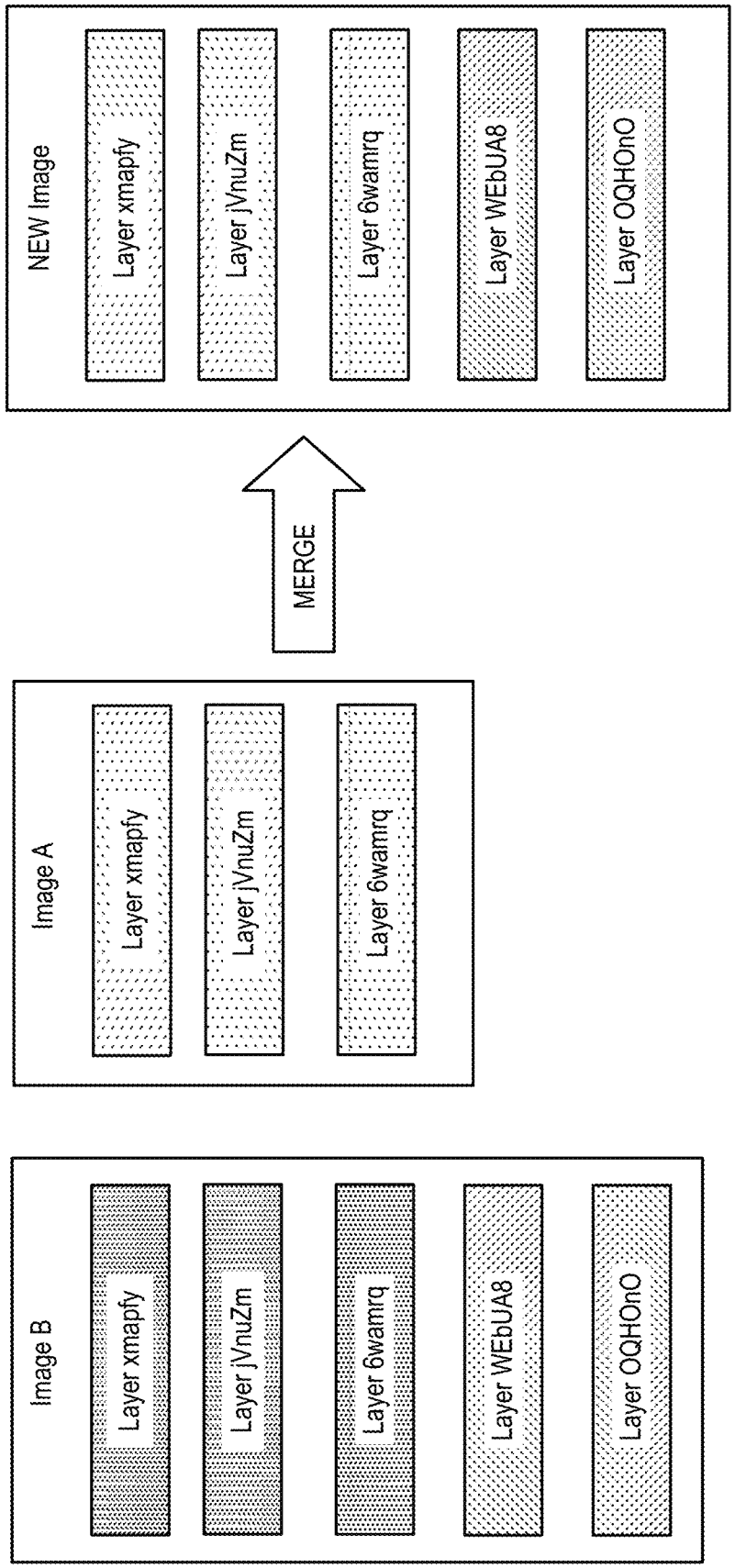

In the example of FIG. 5J, Image A is the subject image, the operation image is specified to be image B, and the atomic action depicted is the "merge" atomic action. In the described example, Image A and Image B can have a common layer therebetween. Namely, the layer having the layer ID layer jVnuZm. Based on Image A and Image B having a common layer, the output image, NEW image output by the specified "merge" atomic action can be absent of content expressing the common layer twice and can include content expressing the common layer only once by operation of the "merge" atomic action. In the example of FIG. 5K, Image B is the subject image, the operation image is specified to be Image A, and the atomic action depicted is the "merge" atomic action. Image B and Image A have three common layers in the described example of FIG. 5K. Thus, in accordance with the described rule of a "merge" atomic action, the output image NEW image can include binary data and/or text data content defining the common layers only once.

Container host node 130 can further execute a "referenced" atomic action. When a "referenced" atomic action is executed a referenced one or more layer specifically referenced by configuration data (e.g. as specified by an administrator user using administrator user interface 400) can be extracted from a subject image using the container image layer directory path determined using the path determination process set forth in reference to (1) herein. Based on a "referenced" atomic action being performed can return a NEW image in accordance with the NEW image depicted in FIG. 5A except that the NEW image can include extracted selected layer binary data and/or text data content rather than extracted first layer binary data and/or text data content. The extracting in accordance with block 230 of the flowchart of FIG. 2 can be prefaced by a selecting as set forth herein according to one embodiment and can include selectively copying binary data and/or text data content from a first one or more layer directory of a first set of directories associated to a first previously built container image to a new one or more layer directory associated to a new container image or can include another extracting process set forth herein, e.g. creating a container image directory for the NEW image and storing therein a pointer reference to the first one or more first layer directory of Image A. Using such a "referenced" atomic action can be advantageous in a variety of embodiments whereas other embodiments can feature use of the atomic actions described with reference to FIG. 5A through 5K without such a "referenced" atomic action being available. Embodiments herein recognize that the set of atomic actions described with reference to FIGS. 5A through 5K can facilitate simplified lightweight deployment across a variety of differently configured container host nodes 130 including different container host nodes having differentiated storage driver characteristics while still allowing any targeted container image to be achieved, e.g. by composing sequences of atomic actions.

Figure 6A:
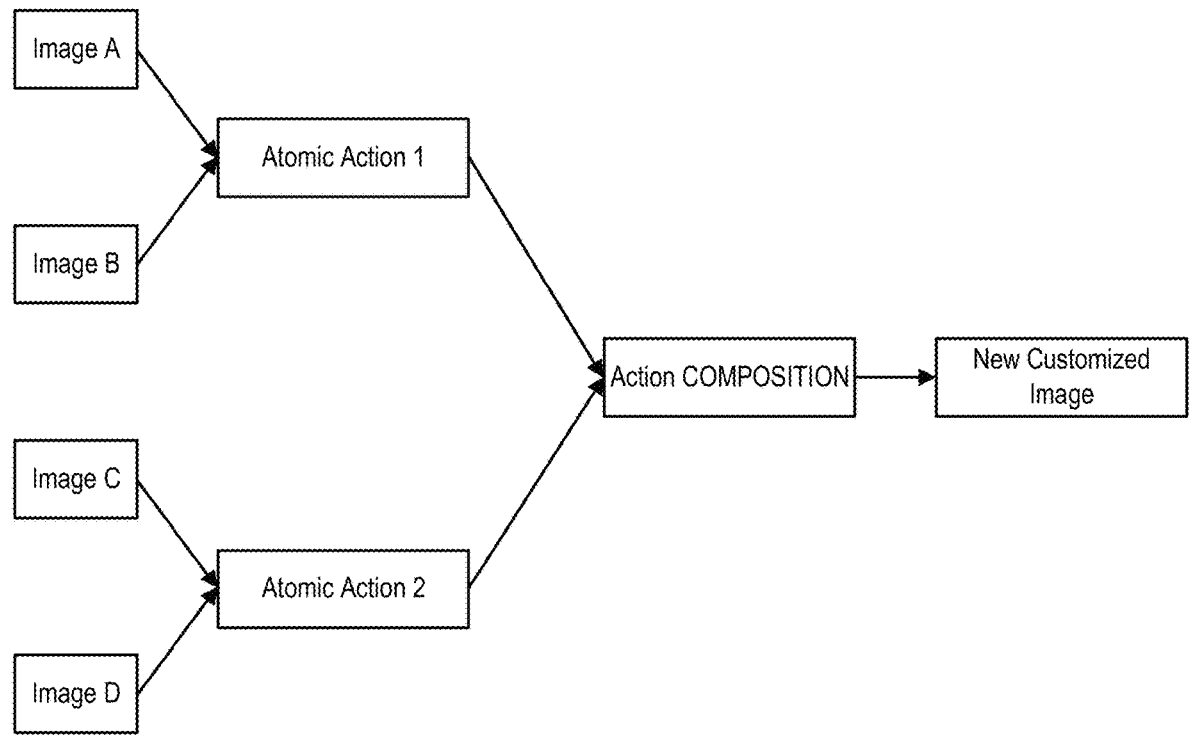
FIGS. 6A-6B are flowcharts depicting action composition according to one embodiment.

FIG. 6A is a flowchart depicting atomic action composition according to one embodiment. Image A and Image B can be subject to processing by atomic action 1 (e.g. intersect, subtract or merge) to provide intermediary stage image (I), and Image C and Image D can be subject to processing by atomic action 2 (e.g. intersect, subtract or merge) to provide intermediary stage image (II). Action composition can include subjecting intermediary image (I) and intermediary stage image (II) to a further atomic action (e.g. intersect, subtract or merge) to return a targeted customized container image.

Figure 6B:
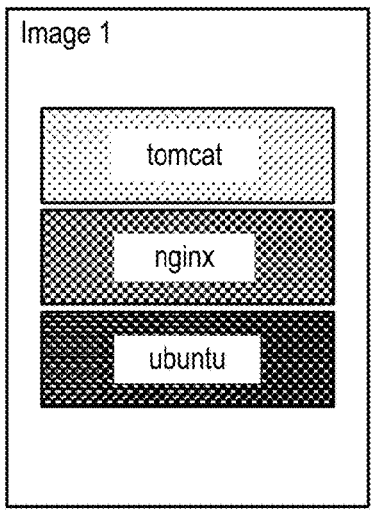
Figure 6B:
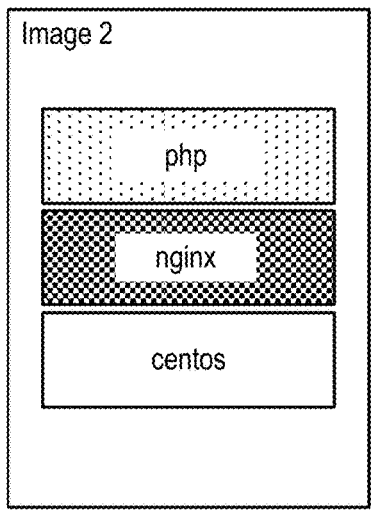
Figure 6B:
Figure 6B:
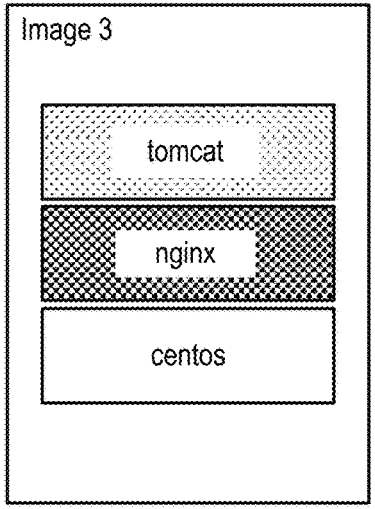
Figure 6B:
Figure 6B:
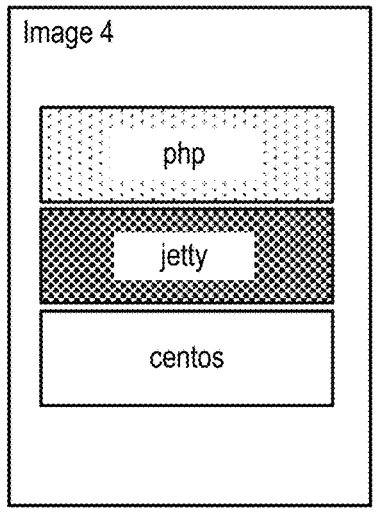

FIG. 6B is a flowchart depicting atomic action composition according to one embodiment. In FIG. 6B depicted atomic actions include single container image atomic actions ("first" and "rest"). Targeted Image 3 can be produced by execution of a composition of atomic actions that process Image 1, Image 2 and the referenced intermediary stage images. Targeted Image 3 can be produced by execution of a composition of atomic actions that process Image 2 and the referenced intermediary stage images.

Referring again to administrator user interface 400 as shown in FIG. 4, an administrator user can use any one of areas 420, 430, and/or 440 to define configuration data that specifies a new container image to be built and/or run to define a runtime container. Referring to area 420 already described, area 420 at 424 can depict graphical representations of container images that have been stored in container image area 2324 of container image repository 132 and/or can depict graphical representations of virtual container images, i.e. container images that theoretically can be built with use of one or more of extracting process 135 and/or combining process 136. System 100 according to one embodiment can be configured so that on selection, e.g. clicking on of one of the graphical representations depicted in area 424, a container image in accordance with the selected depiction is established as the container to be built (if it is a virtual container not already built and/or run to define a runtime container).

Referring to graphical development area 430 of administrator user interface 400, graphical development area 430 can have various uses. Area 431 can display menu indicators indicating, e.g. titles of stored container images stored in container image area 2324 and other metadata associated with such stored images and other registry data from container image registry from 2322 such as lists depicting virtual container images. Using area 432, an administrator user can preview results of applying atomic actions to container images stored in container image area 2324 or virtual container images having profile data stored in container image registry 2322. In area 433 an administrator user can enter text data specifying an atomic action, e.g. "first", "rest", "referenced", "subtract", "intersect", or "merge". To the left of area 433 an administrator user can enter a container image (actual or virtual) serving as a subject image and to the right of area 433 can specify a container image to serve as the operation image. To the right of area 433 can also display a graphical image of resulting image in preview form, e.g. prior to the new container image being created by extraction of binary data and/or text data content from one or more container image and/or by combining binary data and/or text data content of two or more container images or by performance of another extraction process herein. Area 432 can depict in one embodiment graphical images similar to those illustrated in FIGS. 5A-5K as graphical aids to an administrator user who is establishing configuration data specifying a container image to be built and/or run. Area 432 can include features to allow an administrator user to define configuration data specifying action compositions involving one or more intermediary stage container images and/or a sequence of atomic actions.

In area 434 an administrator user can use graphical tools to specify in graphical form a container image to be built and/or run. System 100 can be configured so that in response to an administrator user specifying a graphical depiction in area 434, administrator user interface 400 displays feedback to the administrator user, e.g. on whether such image is already available as a stored container image of container image area 2324 of container image repository 132, can be provided using atomic actions as set forth herein, e.g. by lookup to determine whether the designated container image designated by administrator user using area 434 as a corresponding image stored in a list of virtual container images within container image registry 2322.

Other feedback can include, e.g. recommended processes that might be undertaken, e.g. using area 440 to build the designated container. In area 440 administrator user interface 400 can display a text based development area. In area 441 area 440 can display menu indicators indicating titles of stored container images stored in container image area 2324 and/or additional metadata associated with such container images, e.g. metadata indicating a layer structure of such images. Menu area 441 can also depict data on virtual container images that can be theoretically built by container host node 130 as specified within a virtual container list maintained within container image registry 2322. An administrator user can consult the information displayed in area 441 when using text based development area 442 and/or text based development area 444. Using area 442, an administrator user can specify atomic actions to be performed with respect to specified container images, e.g. container images of container image area 2324 and/or virtual container images as set forth herein.

In area 444 an administrator user can author a container image build file as set forth herein having a series of script commands, e.g. as set forth in the example of Table A. Such script commands in one embodiment can include extended list of script commands. Namely, encoded commands encoded to direct the atomic actions as set forth herein in accordance with the extracting process 135 and/or the combining process 136, e.g. an extension set defining a command library for use in defining a container image build file that can be specified in area 444 can include the atomic actions as set forth herein which atomic actions can include e.g. a "subtract" atomic action expressed as a command, an "intersect" atomic action expressed as a command, and/or a "merge" atomic action expressed as a command.

The specified container image build file authored using area 444 can incorporate both legacy container image build commands, e.g. as set forth in Table A and one or more additional atomic action command as set forth herein. A text based scripting language container image build file can have both one or more legacy scripting language container image build file command and one or more scripting language atomic action commands. In some embodiments, a text based script command container image build file authored using area 444 can encode both commands which can include both one or more scripting language command which pulls a container image from container image area 2404 of central container image repository 140 and one or more scripting language command which specifies execution of one or more atomic action as set forth herein using container binary image data of container image repository 132. Thus, for example, using area 444 according to one embodiment, an administrator user can specify that atomic action(s) be used to create a base image and then can associate to the base image additional one or more layers. Commands specified in area 444 can include commands referencing stored container images of container image area 2324 and certain atomic actions to be applied with respect to such one or more stored container image. In another use case, a command specified using area 444 can specify a virtual container, e.g. as displayed in area 424 in container build process 137 on the building of a specified container image referencing the virtual container image can automatically build the virtual container image using the described tracking data stored within container image registry 2322.

An administrator user can highlight specified selections of areas 420, 430, and/or 440 and with highlighted selections specifying finalized configuration data options. An administrator user can activate control 450 to specify a container build process to build the container image specified using administrator user interface 400 or can activate control 452 to specify a container image build and running of the built container, e.g. an administrator user can activate control 452 to launch the specified container specified by the current selections by the administrator user made using administrator user interface 400.

Continuing with the flowchart of FIG. 3, administrator client computer device 120 at block 1205 can determine that a command to build and or run a container image has been selected by an administrator user, e.g. by selection of control 450 or 452. An administrator client computer device 120 can proceed to block 1206 to send container image configuration data for receipt by container host node 130 at block 1304. The sent container image configuration data can be container image defining selection data made by the administrator user as set forth herein using one or more of area 420, 430, and/or 440 of administrator user interface 400.

On receipt of the container image configuration data at block 1304, container host node 130 can proceed to block 1305 to identify referenced container images within the administrator user defined container image configuration data received at 1304 for use in building a container image to be built. The referenced container image(s) can include container images that serve as layers of the to be built container image. The referenced container image(s) can in addition or alternatively include container images to be subject to extracting for providing a built image. In some embodiments the identified container image(s) identified at block 1305 can include only stored container image(s) of container image area 2324 to be subject to processing by one or more atomic action. In some embodiments, identified reference container image(s) identified at block 1305 can include other container images such as one or more container image of container image area 2404 of central container image repository 140, e.g. in the case container image configuration data is specified using a container image build file that references an externally stored container image stored in container image area 2404 of central container image repository 140.

At block 1306 container host node 130 can perform extracting binary data and/or text data content from one or more stored container image(s) of container image area 2324. Where the container image configuration data specifies one or more "first" atomic action command, the extracting performed at block 1306 can be performed in accordance with the one or more "first" atomic action command. Where the container image configuration data specifies one or more "rest" atomic action command, the extracting performed at block 1306 can be performed in accordance with the one or more "rest" atomic action command. Where the container image configuration data specifies one or more "referenced" atomic action command, the extracting performed at block 1306 can be performed in accordance with the one or more "referenced" atomic action command. Where the container image configuration data specifies one or more "subtract" atomic action command, the extracting performed at block 1306 can be performed in accordance with the one or more "subtract" atomic action command. Where the container image configuration data received at block 1304 specifies one or more "intersect" atomic action command, the extracting performed at block 1306 can include performing of the one or more "intersect" atomic action command. By performing of extracting at block 1306, a subset of binary data and/or text data content of one or more specified stored multiple layer container image can be extracted. Where container image configuration data received at block 1304 specifies a virtual container image the extracting performed at block 1306 can be performed in accordance with the tracking data of container image registry 2322 as set forth herein.

According to one embodiment, configuration data received at block 1304 can be provided in response to an administrator user specifying target designated runtime container image, specified using e.g. area 430 and/or area 440 of administrator user interface 400. The target designated container image can specify a layer order, and the configuration data can specify, using the virtual container image functionality and tracking data as set forth herein, an order of one or atomic action to be performed for providing of the target designated runtime container image.

According to one embodiment, configuration data received at block 1304 can be provided in response to an administrator user specifying target container image, specified using e.g. area 430 and/or area 440 of administrator user interface 400, the target container image provided by performance of one or more atomic action with respect to a specified one or more container image, and further specifying e.g. using area 440 of administrator user interface 400 additional build commands for defining a designated runtime container image.

The extracting at block 1306 can be prefaced by a selecting performed by container host node 130. The selecting can include according to one embodiment container host node 130 identifying directories of first container image storing content for use in a second image (e.g. an intermediary or designated runtime container image). For example an order of atomic actions specified in configuration data to be performed may specify an atomic action as set forth in FIG. 5B, wherein a first subset of content from a first container image (Image A) according to the logical rules of the action is to be included in a second container image (NEW image), and wherein the subset of content is the layer content of the layers having the layer IDs jVnuZm, and 6wamrq. For selecting the layers identified by the layer IDs, container host node 130 can identify system memory layer directories in which the content of the layers having the layer IDs jVnuZm, and 6wamrq are stored.

Container host node 130 for extracting certain binary data and/or text data content from a first container image for providing a new container image having the extracted binary data and/or text data content can for example select a first subset of binary data and/or text data content of the first container image and can establish a second container (e.g. a new container image such as NEW Image of FIG. 5B in the described example) so that the second container image includes the first subset of binary data and/or text data content of the first container image and is absent a second subset of binary data and/or text data content of the first container image.

For performing the extracting and establishing the second container image which can be a new container image, container host node 130 can, according to one embodiment, provide a new container image directory for the second container image and for performing the extracting container host node 130 can store a reference to the first subset of binary data and/or text data content. The reference can include pointer to a directory, e.g. as provided by a first layer directory associated to the first container image in which the first subset of binary data and/or text data content is stored. In one embodiment, for performing the extracting, container host node 130 can establish a new layer directory associated only to the second container image for storing the first subset of binary data and/or text data content (e.g. a new layer directory) and can copy the first subset of binary data and/or text data content from the first layer directory e.g. a layer directory associated to the first container image to the new layer directory associated only to the second container image. In one embodiment, for performing the extracting, container host node 130 can store in the new container image directory for the second container image a pointer to the first layer directory, the pointer defining the reference to the first subset of binary data and/or text data content.

For performing the extracting and establishing the second container image which can be a new container image, container host node 130 can, according to one embodiment, without providing a new container image directory for the second container image, record a list of content defining the second container image. The list can include a reference to the first subset of binary data and/or text data content of the first container image and can be absent a reference to a second subset of content of the first container image. The reference can include pointer to a directory, e.g. as provided by a first layer directory in which the first subset of binary data and/or text data content of the first container image is stored. Where the second container image is an intermediary image to be subject to further processing for the building of a designated runtime container image, it can be advantageous, for reduced overhead, to provide the container image by recording a list of content defining the second container image without creation of a new directory. Where the second container image is an intermediary image to be subject to further processing for the building of a designated runtime container image, it can be advantageous, e.g. for operational consistency, to create one or more of a new container image directory and/or a new layer directory for storing data of the first subset of content subsect to extracting from the first container image.

Activating extracting process 135 at block 1306 can include activating a prefacing selecting function which can include identifying a directory in which a certain layer of the first container image which can be provided by a multiple layer container image is stored. The identifying can be based on returned data returned by executing of command data, the returned data including (a) a list of layer IDs identifying layers of the multiple layer container image including the certain layer (e.g. in one embodiment as described in connection with Table C herein), and (b) a file directory path that specifies a directory of the set of directories in which the certain layer is stored (e.g. in one embodiment as described in connection with a process for return of a directory path according to directory path (1)).

At block 1307 container host node 130 can determine whether additional build processes (other than those involving extracting) are specified in the container image configuration data received at block 1304. Such additional build processes can include, e.g. pulling one or more container image defining a layer of a to be built container image from container image area 2404 of central container image repository 140. Such additional build processes can also or alternatively include, e.g. performing a process of combining process 136, e.g. executing a "merge" command to merge stored container images, e.g. composing of atomic actions, e.g. as set forth herein e.g. in reference to FIGS. 6A and 6B and or use of intermediary images as set forth in reference to FIGS. 6A and 6B.

At block 1308, container host node 130 can perform any additional build processes determined at block 1307 specified by container image configuration data received at block 1304 and then can proceed to block 1309 to run the designated runtime container image defined by the further building and the container image configuration data received at block 1304. The designated runtime container can include a container image having the extracted binary data and/or text data content resulting from the extracting performed at block 1306.

Based on functionalities set forth herein, a designated runtime container image, e.g. built using multiple build operations involving one or more intermediary image and having the first subset of content extracted from a first container image can store in a system memory of container host node 130 container image directory that includes a pointer reference to a first layer file directory storing the first subset of content. Accordingly, in one embodiment, a container image directory of the designated runtime container image and a container image directory of the first container image can commonly reference the described first layer directory that stores the described first subset of content described herein.

In the case no additional build processes are specified in received container image configuration data received at block 1304, container host node 130 can proceed to block

1309 to perform running of a designated runtime container image specified by container image configuration data received at block 1304. The designated runtime container image can include a container image having the binary data and/or text data content resulting from the extracting performed at block 1306.

Embodiments herein can include extracting binary data and/or text data content from a multiple layer first container image having multiple layers, wherein binary data and/or text data content stored in first memory locations of a system memory defines the multiple layers of the multiple layer first container image, wherein the extracting binary data and/or text data content from the multiple layer container image includes copying a first subset of the binary data and/or text data content stored in the first memory locations of the system memory to second memory locations of the system memory, the second memory locations being external to the first memory locations, wherein the first subset of the binary data and/or text data content subject to copying defines extracted binary data and/or text data content resulting from the extracting binary data and/or text data content from the multiple layer container image. For example, a container image according to "Image A" subject to a "first" "rest" "subtract" or "intersect" atomic action as set forth in FIGS. 5A-5H or a subject image subject to a "referenced" atomic action can be stored in first memory locations defined by a first set of file directories of container image area 2324 defined by a system memory of container host node 130. Based on the performance of the atomic action to provide a NEW image described in connection with "first" "rest" "subtract" or "intersect" or "referenced" atomic actions, container host node 130 can copy binary data and/or text data content defining layer(s) of the subject container image to second memory locations of a system memory of container host node external to the first memory locations. According to one example, the second memory locations can include a new one or more directory established for performing the atomic action.

For extracting content, container host node 130 can additionally or alternatively create a new container image directory for a new container image, wherein the new container image directory for the new container image stores a pointer reference to a first layer directory of the first container image storing the first subset of the binary data and/or text data content.

For extracting content, container host node 130 can additionally or alternatively record a list of content defining the new container image, wherein the list can include a reference to first layer directory of the first container image storing the first subset of the binary data and/or text data content.

Embodiments herein can include running a designated runtime container image to provide a runtime container, the designated runtime container image having the extracted binary data and/or text data content resulting from the extracting binary data and/or text data content from the multiple layer container image. Referring to the described example, a "NEW image" described in reference to "first" "rest" "subtract" or "intersect" or "referenced" atomic actions can serve as an intermediary stage image that can be subject to further processing to define a runtime container image that includes the extracted binary data and/or text data content. Alternatively, the "NEW image" described in reference to "first" "rest" "subtract" or "intersect" or "referenced" atomic actions herein can serve as a designated runtime container image subject to running to define a runtime container. In some embodiments the designated runtime container image can include binary data and/or text data content provided by the extracted binary data and/or text data content stored in the second memory locations referred to in the described example. In some embodiments the designated runtime container image can include the extracted binary data and/or text data content but based on further processing of the referred to "NEW image" may not include binary data and/or text data content stored in the second memory locations.

According to one embodiment, a first container image (block 210 of the flowchart of FIG. 2) (which can be provided by a multiple layer container image having multiple layers, wherein binary data and/or text data content stored in first memory locations of a system memory defines the multiple layers of the multiple layer container image) that is subject to extracting (block 230 of the flowchart of FIG. 2) can itself be a designated runtime container image that is subject to running to define a runtime container. Thus, a given container image can serve as both a runtime container image and as a source for layer specific container images. Container host node 130 can subject the multiple layer container image defined by binary data and/or text data content to running (block 240) to define a runtime container prior to or subsequent to the extracting (block 230). A runtime container that is run by subjecting the multiple layer container image (block 240) to running can be running at the time of performing the extracting (block 230).

A container image as set forth herein is a stand-alone, executable package of a piece of software that includes everything needed to run it: code, runtime, system tools, system libraries, settings. It eliminates "it works on my local machine" problem. With use of containers, developers can for example develop an application in test environment and have confidence that the application will operate in a production environment.

Embodiments herein recognize that it takes time to build a container image from scratch, even based on a legacy container image. Embodiment herein recognize that it takes time to download a container image which is shared from central container image registry e.g. a DOCKER® registry (private/public).

Embodiment herein recognize that when some configurations in a container image are insufficient, or some software content is missing, multiple resource consuming operations may be required using existing technologies. Such operations can include e.g. re-authoring a container image build file e.g. a DOCKERFILE™, and running the container image build file to build a container image, a process that can include resource consuming downloads from a central container image repository.

Embodiment herein recognize that although a running container can be light weight, a process for building a container image may not be light weight. Container images commonly have Gigabytes size resulting in considerable resource consumption including time consumption during transferring and sharing.

Embodiments herein recognize that in some cases container image build files and container images resulting from building using a container image build file can have common attributes. Embodiments herein facilitate use of multiple layer building block container images that can be used for the building of multiple different container images. For example, an administrator user may have a requirement for a first container image having the layers A-B-C-D-E-F-G and a second container image having the layers A-B-C-D-E-H-I. Embodiments herein recognize that using existing technologies an administrator user may author a first container image build file for building the first container image and may author a second container image file for building the second container image. Both container image build files may be run for building the images and each build can include downloading each of the container images for layers A-B-C-D- and E from a central container image repository 140. In accordance with embodiments herein an administrator user among a variety of options made available can author a container image build file (i) for building the container image (a) A-B-C-D-E, and separately can author a container image build file (ii) for building the container image (b) having layers E-F-G and can author a container image build file (iii) for building the container image (c) having the layers H-I. Atomic actions e.g. "merge" can be used to quickly build the targeted first and second container images any time after the initial build of container images (a) (b) and (c) without further download of container images from a central container image. The targeted container images with reduction of downloads of central container image repository and with improved system memory utilization of a container host node. Prior to a time of build of the targeted container images, the container host nodes may store a single instance of the container layer images A-B-C-D-E.

Embodiments herein can include processes for building a container image without use of a container image build file or with use of a simplified lightweight build file that can include atomic action commands for directing performance of atomic actions as set forth herein. There is no need to write a full-detailed container build file such as a detailed DOCKERFILE™ container build file. Rather, according to one embodiment, a library of simple stock building block container images can be provided (such as the container images (a) (b) and (c) in the preceding example). With use of atomic actions with or without use of composing multiple actions, new custom container images can be rapidly build with reduced or no downloads from a central container image repository. In some embodiments as set forth herein use of container image build files can be advantageous. In some embodiments a container image build file can be used wherein the container image build file includes one or more command for performing an atomic action.

In one embodiment building of a designated runtime container image can include composing a sequence of atomic action that generates one or more intermediary stage container image which intermediary stage container image can be subject to processing using one or more atomic action.

Embodiments herein can conserve network bandwidth and initializing time during a first-time run. Once a large container image is downloaded, a layer or layers of interest of the downloaded container of interest can be extracted from the downloaded now local container image alleviating a need to separately download the targeted layer or layers of interest.

In addition, embodiments herein can reduce a need to download multiple layer container images from a central container image repository 140. According to one embodiment, libraries and executable code associated with extracting process 135 and combining process 136 can be installed on central container image repository 140 for running by central container image repository 140 (e.g. a private area thereof) including libraries and executable code facilitating performance of atomic actions herein. According to such an embodiment, an administrator user using administrator user interface 400 can identify a desired large container image (multiple layer) having all layers in common with layers available locally on a system memory of container host node 130 except that the desired large container image can include a limited number (1 to K) additional layers. An administrator user using administrator user interface 400 can activate execution of one or more atomic action by central container image repository 140 to extract the limited number of 1 to K additional layers from the desired large container image. The resulting lightweight image resulting from the extraction can be downloaded to container host node 130 based on execution additional administrator user defined command data defined using administrator user interface 400. Additional administrator user defined command data defined using administrator user interface 400 can be executed by container host node 130 (including atomic action commands) to re-build the desired large container image on container host node 130 downloading only the limited number of 1 to K additional layers without downloading the entire desired large container image from central container image repository 140.

By atomic action, building a new container image is simplified, and problems associated with use of complex container image build files can be avoided. For example, problems associated with missing configurations and software content requiring repeated downloading of container images and de-bugging operations can be avoided.

A container image build file can include scripting language encoded atomic action commands set forth herein for extracting binary data and/or text data content from one or more container image and/or combining new container images using binary data and/or text data content of first and second container images. Atomic action commands included in a scripting language container image build file can reduce an overall number of commands of a container image build files and can avoid use of commands to pull container images from external sources such as a central container image repository. With a reduced and simplified set of commands a resulting lightweight container image build file can be made easier to share and edit for purposes of authoring new container image build files.

Embodiments herein recognize that currently, in order to build a container image, there are two general approaches. One approach (a) is to start a real-time container image based on one specified pre-built container image e.g. available from a central container image repository, run some necessary commands to install software and do some one-time setup, commit the container which is on live in memory as a new container image. Another approach includes (b) authoring a full-detailed container image build file to build a container image from scratch. Drawbacks are observable for both approach (a) and (b).

According to approach (a) lengthy download times are possible and large container images can consume a significant amount of storage in a container host node system memory. Further, options for customization are not available or are limited in the case the large container image does not satisfy a requirement of a specification.

According to approach (b), system bandwidth can be consumed by pull downs of container images from a central container image repository. Also as the complexity of designed container image increases complexity of a container image build file can increase significantly leading to heavy weighted container image build file that is difficult to share and debug. According to a debugging process, if any step is incorrect in a container image build file is incorrect, the container image build file need to be re-built from all steps subsequent to a cache hit.

Embodiments herein recognize that if some settings are missing after running a container image to provide a runtime container to provide a service, the container image build file used to build the container image may require re-authoring and the re-authored container build file may need to be run to rebuild the container image.

According to one embodiment first and second container images can be manipulated by atomic action to build a NEW image. Atomic actions can be provided as compositions of two or more atomic action. Theoretically speaking, atomic action chains can be infinite, so if current container images are sufficient, any targeted container image can be built by atomic action and atomic action composition, no matter how complicated requirement is.

Certain embodiments herein may offer various technical computing advantages involving computer advantages to address problems arising in the realm of computer networks and computer systems. Embodiments herein can feature, for example, improved processes for building of container images for subjecting to running to define a runtime container. Embodiments herein can feature processes for extracting binary data and/or text data content from container images and optional further processes to define the designed runtime container image for subjecting to running to define a runtime container. Embodiments herein can feature lightweight manipulations of binary data and/or text data content of one or more stored container image to build one or more new container image that can serve as a container image subject to running to define a runtime container or which can serve as an intermediary stage image subject to further processing to define a designated runtime container image. The manipulations involving binary data and/or text data content can be lightweight and resource conserving relative to alternative processes involving, e.g. downloading of large container images from a central container image repository. Atomic actions can be provided to facilitate extracting of binary data and/or text data content from container images and/or for composing new container images having content of a plurality of stored container images. The atomic actions can specify rules defining output binary data and/or text data content in the case that first and second stored container images are specified for processing in accordance with a specified atomic action, which can include, e.g. a command for extract binary data and/or text data content and/or a command to combine binary data and/or text data content. Embodiments herein facilitate improved memory utilization. For example, embodiment herein can avoid a practice of storing or downloading single layer or limited layer container images for support of new container image builds. Rather, access to single layer or limited layer binary data and/or text data content can be provided by storing large multiple layer container images having layer specific binary content that can be subject to extracting. Embodiments herein can reduce or avoid a need for downloads of container images from a central container image repository. Embodiments herein can feature improved use of a system memory of a container host node which can store container images. In the case a new container image is to be built, the new container image can be built using manipulation of binary data and/or text data content of one or more stored container image stored in a system memory of container host node.

Figure 7:
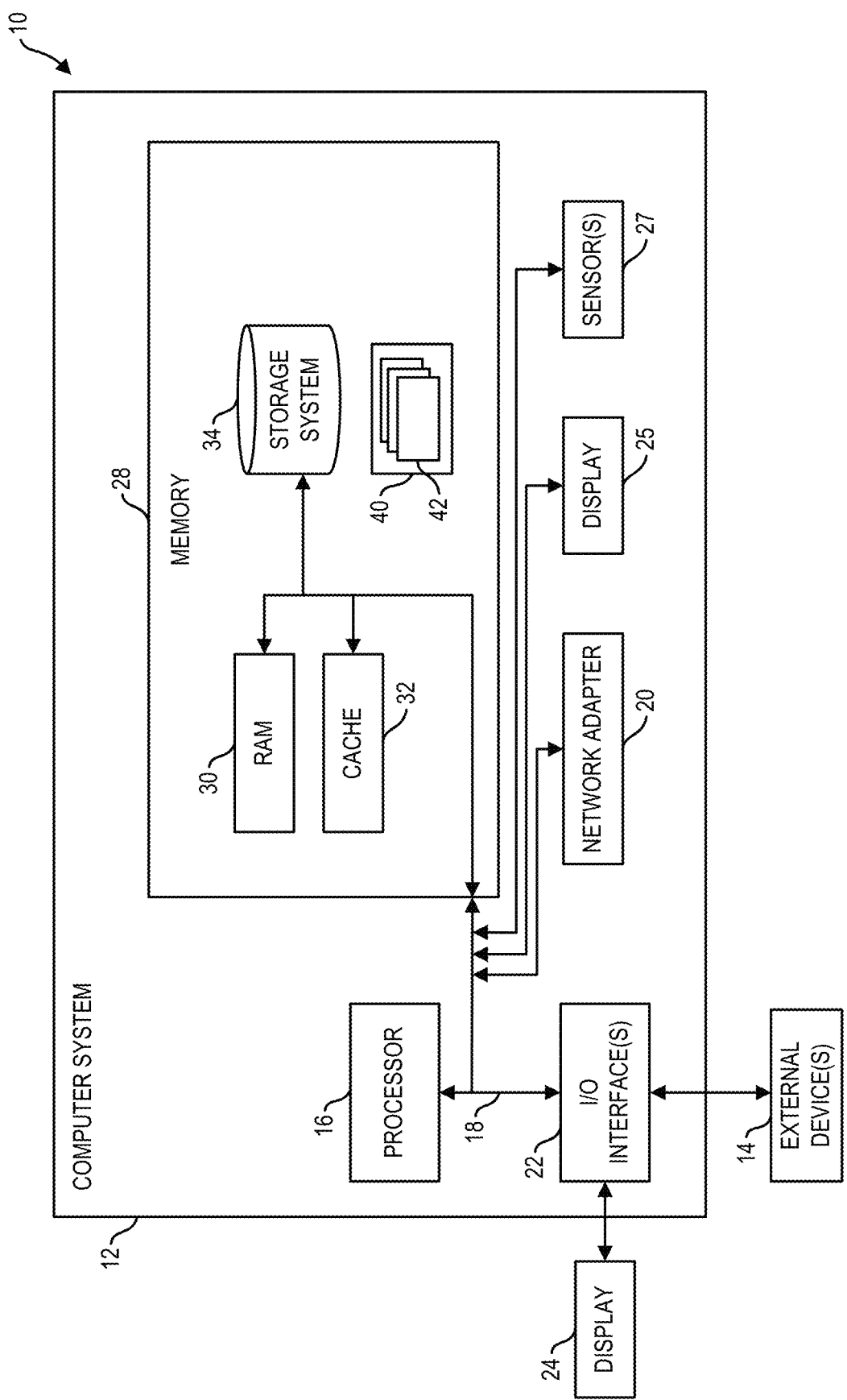
FIG. 7 depicts a computing node according to one embodiment.
Figure 8:
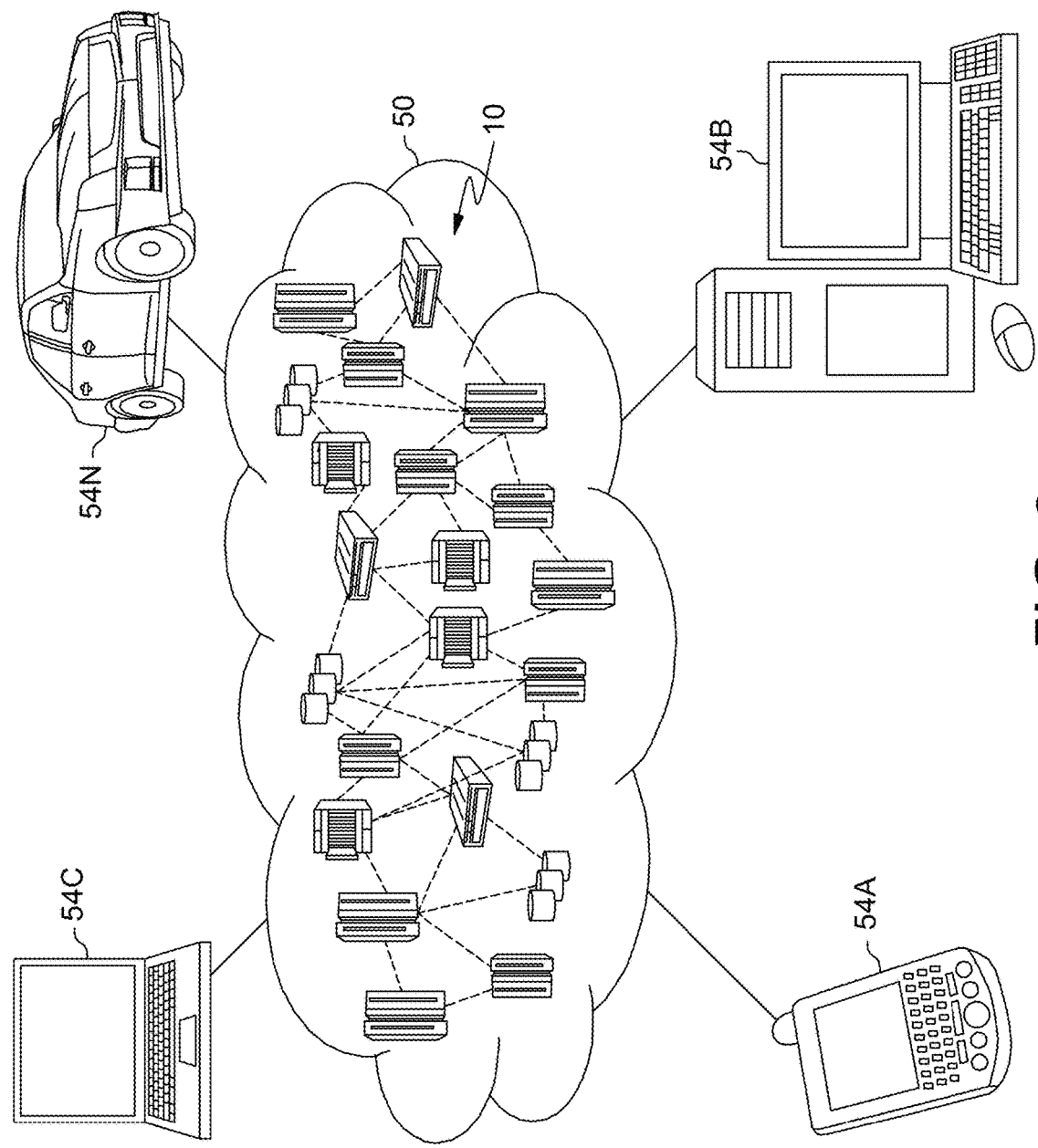
FIG. 8 depicts a cloud computing environment according to one embodiment.
Figure 9:
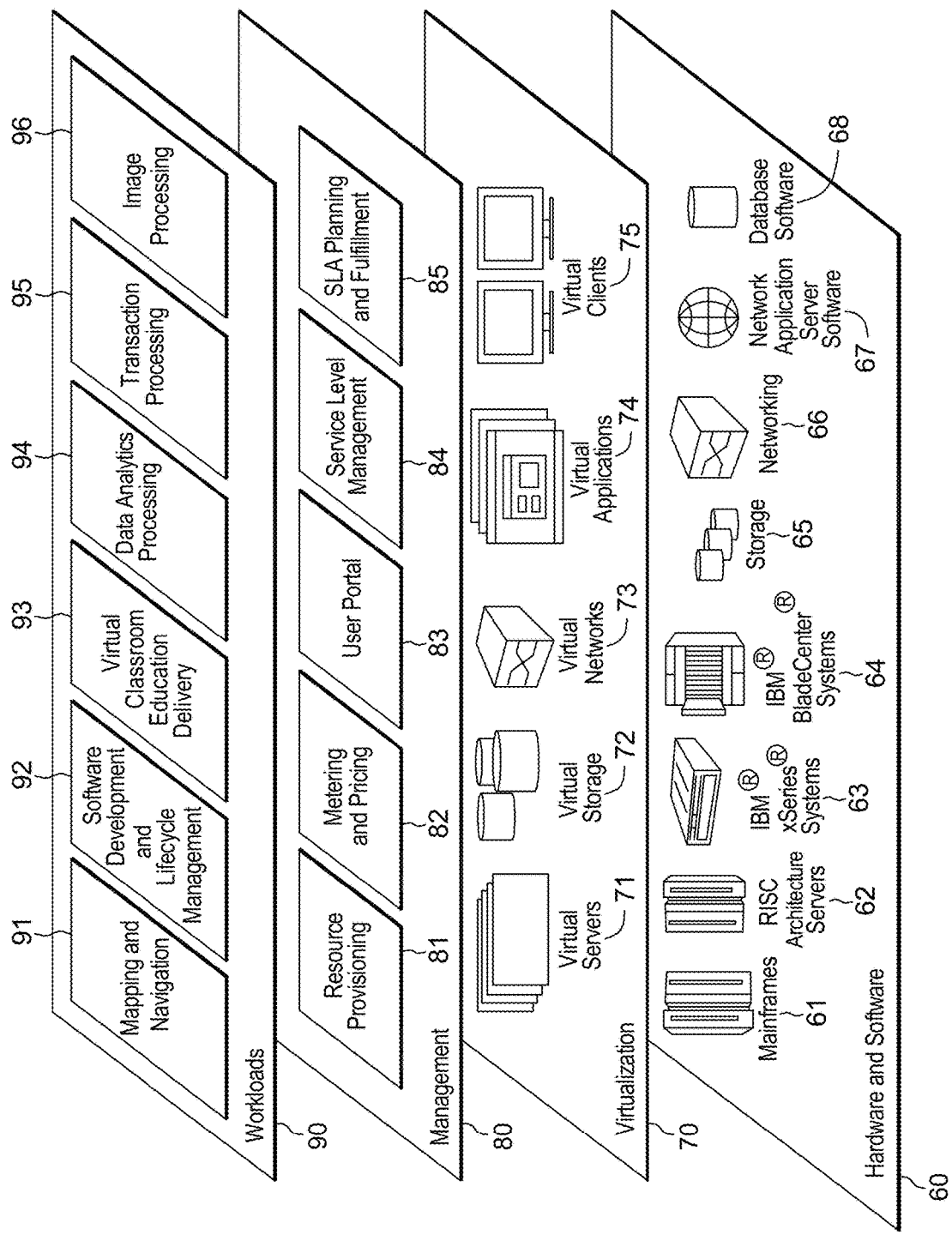
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, container host node 130 can include one or more computing node 10 and can include one or more program 40 for performing functions described with reference to method 200 of the flowchart of FIG. 2 and functions described with reference to container host node 130 as set forth in the flowchart of FIG. 3. In one embodiment, administrator client computer device 120 can include one or more computing node 10 and can include one or more program 40 for performing functions described with reference to administrator client computer device 120 as set forth in the flowchart of FIG. 3. In one embodiment, central container image repository 140 can include one or more computing node 10 and can include one or more program 40 for performing functions described with reference to central container image repository 120 as set forth in the flowchart of FIG. 3. In one embodiment, the computing node based systems and devices depicted in FIG. 1A can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for building container images as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining configuration data that specifies a designated runtime container image;
selecting a first subset of content of a first container image stored in a system memory, the selecting based on an action referenced in the configuration data;
extracting the first subset of content from the first container image, the extracting including providing a second container image that includes the first subset of content of the first container image and is absent of a second subset of content of the first container image; and
running the designated runtime container image to provide a runtime container, the designated runtime container image having the first subset of content of the first container image, wherein the method includes building the designated runtime container, the building including the selecting and the extracting, wherein the action is an atomic action provided by a "first" atomic action resulting in extraction of a top layer of the first container image, wherein the building includes performing a "rest" atomic action resulting in extraction of all layers other than a top layer from a third container image, a "subtract" atomic action resulting in extraction of from a fourth container image layers not commonly included in an operation container image and an "intersect" atomic action resulting in extraction from a fifth container image layers commonly included in an operation container image.

2. The method of claim 1, wherein the method includes building the designated runtime container image, the building including combining binary data and/or text data content of the first container image with binary data and/or text data content of third container image.

3. The method of claim 1, wherein the extracting the first subset of content of from the first container image is performed by a central container image repository, and wherein the running the designated runtime container image to provide a runtime container is performed by a container host node, and wherein the central container image repository is remote from the container host node.

4. The method of claim 1, wherein the first subset of content of the first container image is layer content of the first container image, the layer content having an associated layer ID and an associated first layer directory of the system memory for storing the first subset of content of the first container image, and wherein the method includes building the designated runtime container image, the building being performed so that a container image directory for the designated runtime container includes a reference to the first layer directory of the system memory for storing the first subset of content of the first container image.

5. The method of claim 1, wherein the configuration data includes administrator user defined configuration data defined using an administrator user interface that permits an administrator to specify a graphical representation graphically depicting an ordering of layers of the designated runtime container image.

6. The method of claim 1, wherein the extracting the first subset of content from the first container image includes extracting binary data and/or text data content and is performed by a container host node external to a remote central container image repository, wherein the method includes building the designated runtime container using a container image build file that includes a first command to cause an image pull from the remote central container image repository to the container host node and a second atomic action command to direct the extracting.

7. The method of claim 1, wherein the method includes building the designated runtime container image using a container image build file that includes a first command to cause a container image pull from a remote central container image repository and a second atomic action command to direct the extracting, wherein the first container image is a multiple layer container image stored locally in a system memory of a container host node, and wherein the running the designated runtime container image includes running the designated runtime container image on the container host node.

8. The method of claim 1, wherein the method includes further extracting a specified subset of content from a third container image, and wherein the method includes building the designated runtime container image, wherein the building includes using the first subset of content extracting, and wherein the building includes using the specified subset of content resulting from the further extracting.

9. The method of claim 1, wherein the configuration data is administrator user defined configuration data defined by an administrator user using an administrator user interface, wherein the administrator user interface facilitates display of information specifying container image IDs identifying container images having the first subset of content in response to administrator user entry of information specifying a layer defined by the extracted first subset of content.

10. The method of claim 1, wherein the configuration data is administrator user defined configuration data defined by an administrator user using an administrator user interface, wherein the administrator user interface facilitates display, with use of a decision data structure that associates container image IDs to container layer IDs, of information specifying a list to layer IDs associated to the first container image.

11. The method of claim 1, wherein the extracting includes creating a new container image directory for the second container image, and storing in the new container image directory a reference to a layer directory of the first container image in which the first container image is stored.

12. A computer program product comprising:
a computer readable storage medium readable by one or more processing circuit and storing instructions for execution by one or more processor for performing a method comprising:
  obtaining configuration data that specifies a designated runtime container image;
  selecting a first subset of content of a first container image stored in a system memory, the selecting based on an action referenced in the configuration data;
  extracting the first subset of content from the first container image, the extracting including providing a second container image that includes the first subset of content of the first container image and is absent of a second subset of content of the first container image; and
  running the designated runtime container image to provide a runtime container, the designated runtime container image having the first subset of content of the first container image, wherein the method includes building the designated runtime container, the building including the selecting and the extracting, wherein the action is an atomic action provided by a "first" atomic action resulting in extraction of a top layer of the first container image, wherein the building includes performing a "rest" atomic action resulting in extraction of all layers other than a top layer from a third container image, a "subtract" atomic action resulting in extraction of from a fourth container image layers not commonly included in an operation container image and an "intersect" atomic action resulting in extraction from a fifth container image layers commonly included in an operation container image.

13. The computer program product of claim 12,
wherein the configuration data is administrator user defined configuration data,
wherein the selecting, and the extracting are performed in response to a user activated control to initiate processing of the configuration data for building of the designated runtime container, wherein the building includes performing the selecting and the extracting, and wherein the first subset of content subject to the extracting from the first container image is predetermined based on administrator user defined configuration data prior to the processing.

14. A system comprising:
a memory;
at least one processor in communication with the memory; and
program instructions executable by one or more processor via the memory to perform a method comprising:
obtaining configuration data that specifies a designated runtime container image;
selecting a first subset of content of a first container image stored in a system memory, the selecting based on an action referenced in the configuration data;
extracting the first subset of content from the first container image, the extracting including providing a second container image that includes the first subset of content of the first container image and is absent of a second subset of content of the first container image; and
running the designated runtime container image to provide a runtime container, the designated runtime container image having the first subset of content of the first container image, wherein the method includes building the designated runtime container, the building including the selecting and the extracting, wherein the action is an atomic action provided by a "first" atomic action resulting in extraction of a top layer of the first container image, wherein the building includes performing a "rest" atomic action resulting in extraction of all layers other than a top layer from a third container image, a "subtract" atomic action resulting in extraction of from a fourth container image layers not commonly included in an operation container image and an "intersect" atomic action resulting in extraction from a fifth container image layers commonly included in an operation container image.

15. The system of claim 14,
wherein the configuration data is administrator user defined configuration data having a certain set of layers in a certain layer order;
wherein the selecting, and the extracting are performed in response to a user activated control for initiating processing of the configuration data for building of the designated runtime container, wherein the building includes performing the selecting and the extracting, and wherein a certain set of layers and a certain layer order of the designated runtime container image are predetermined based on administrator user defined configuration data prior to the initiating processing.

16. The system of claim 15, wherein the first subset of content subject to the extracting from the first container image is predetermined based on the administrator user defined configuration data prior to the processing.

17. The system of claim 15, wherein the administrator user defined configuration data has been defined by the administrator user with use of a graphics development user interface area that permits the administrator user to enter control data to cause presentment of a graphical depiction of an unbuilt container image which can theoretically be built and run, wherein the method includes providing tracking data that species an order of actions for building the unbuilt container image, wherein the user initiated control includes a control to establish the unbuilt container image as the designated runtime container image, and wherein the configuration data is provided using the tracking data in response to the user initiated control.

18. The system of claim 15, wherein the administrator user defined configuration data is provided by an administrator user authored build file, wherein the administrator user authored build file includes a plurality of scripting language commands, the plurality of scripting language commands including a first scripting language command for directing pulling the first container image from a central container image repository to a container host node, a second scripting language command for directing the extracting by the container host node, and a third scripting language command for combining, by the container host node, the second container image with a third container image for performing the building of the designated runtime container.

19. The system of claim 15, wherein the administrator user defined configuration data is provided by an administrator user authored build file, wherein the first container image is stored in a central container image repository, wherein the extracting the first subset of content of from the first container image is performed by the central container image repository, and wherein the running the designated runtime container image to provide a runtime container is performed by a container host node, and wherein the central container image repository is remote from the container host node, wherein the administrator user authored build file includes a plurality of commands, the plurality of commands including a first command for directing the extracting by the central container image repository, and a second command directing pulling the second container image from a central container image repository to the container host node.

20. The system of claim 15, wherein the administrator user defined configuration data is provided by an administrator user authored build file, wherein the administrator user authored build file includes a plurality of scripting language commands, the plurality of scripting language commands including a "rest command" which directs the extracting, wherein the second container image has all of the layers of the first container image except for a top layer thereof.

* * * * *